United States Patent
Cheng et al.

(10) Patent No.: US 12,526,615 B2
(45) Date of Patent: Jan. 13, 2026

(54) USER PLANE PROTOCOL DESIGN FOR NEW RADIO (NR) SIDELINK DISCOVERY MESSAGE

(71) Applicant: QUALCOMM Incorporated, San Diego, CA (US)

(72) Inventors: Peng Cheng, Beijing (CN); Karthika Paladugu, San Diego, CA (US); Hong Cheng, Basking Ridge, NJ (US); Dan Vassilovski, Del Mar, CA (US); Gavin Bernard Horn, La Jolla, CA (US); Soo Bum Lee, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/928,562

(22) PCT Filed: Jul. 30, 2020

(86) PCT No.: PCT/CN2020/105784
§ 371 (c)(1),
(2) Date: Nov. 29, 2022

(87) PCT Pub. No.: WO2022/021203
PCT Pub. Date: Feb. 3, 2022

(65) Prior Publication Data
US 2023/0217232 A1 Jul. 6, 2023

(51) Int. Cl.
*H04W 8/00* (2009.01)
*H04W 76/14* (2018.01)
*H04W 88/04* (2009.01)

(52) U.S. Cl.
CPC ........... *H04W 8/005* (2013.01); *H04W 76/14* (2018.02); *H04W 88/04* (2013.01)

(58) Field of Classification Search
CPC ...... H04W 8/005; H04W 76/14; H04W 88/04
(Continued)

(56) References Cited

U.S. PATENT DOCUMENTS 9,426,228 B2 * 8/2016 Kneckt ................... H04L 67/51
9,936,371 B2 * 4/2018 Klatt ..................... H04W 4/023
(Continued)

FOREIGN PATENT DOCUMENTS

| AU | 2012376802 A1 * | 10/2014 | .......... H04W 12/062 |
| CN | 106464715 A | 2/2017 | |

(Continued)

OTHER PUBLICATIONS

Ericsson: "On the NR Sidelink Discovery Procedures", 3GPP TSG-RAN WG1 #94-Bis Tdoc, R1-1811595, Oct. 12, 2018 (Oct. 12, 2018), 4 Pages, section 3.
(Continued)

*Primary Examiner* — Melvin H Pollack
(74) *Attorney, Agent, or Firm* — QUALCOMM Incorporated

(57) ABSTRACT

Aspects of the disclosure relate to discovery in a wireless communication network. According to one aspect, a user equipment (UE) may determine to use a service associated with a sidelink communication, determine a contents of a discovery message including an indication of the message being the discovery message for the service, and determine a sidelink resource for use to transmit the discovery message. The UE may then transmit over a user plane using the determined sidelink resource the discovery message including the indication of the message being the discovery message for the service. Other aspects, embodiments, and features are also claimed and described.

28 Claims, 17 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 9,936,531 | B2* | 4/2018 | Wang | H04W 8/005 |
| 10,511,954 | B2* | 12/2019 | Sen | H04W 76/14 |
| 10,575,241 | B2* | 2/2020 | Pang | H04W 40/246 |
| 10,819,778 | B2* | 10/2020 | Li | H04W 40/246 |
| 11,368,836 | B2* | 6/2022 | Adachi | H04W 72/02 |
| 11,412,467 | B2* | 8/2022 | Kim | H04L 27/2607 |
| 11,425,775 | B2* | 8/2022 | Ganesan | H04B 7/088 |
| 11,457,355 | B2* | 9/2022 | Pan | H04W 12/50 |
| 11,516,749 | B2* | 11/2022 | Scholand | H04W 52/242 |
| 11,589,257 | B2* | 2/2023 | Lee | H04W 72/02 |
| 11,706,721 | B2* | 7/2023 | Yi | H04W 72/569 370/329 |
| 11,765,711 | B2* | 9/2023 | Chang | H04L 1/1887 370/312 |
| 11,910,457 | B2* | 2/2024 | Chen | H04W 76/18 |
| 11,991,716 | B2* | 5/2024 | He | H04L 5/0053 |
| 11,997,644 | B2* | 5/2024 | Ji | H04W 68/02 |
| 12,004,001 | B2* | 6/2024 | Zhang | H04W 4/70 |
| 12,004,137 | B2* | 6/2024 | Kim | H04W 72/20 |
| 12,010,743 | B2* | 6/2024 | Hu | H04W 72/20 |
| 12,035,185 | B2* | 7/2024 | Berggren | H04W 48/14 |
| 12,035,337 | B2* | 7/2024 | Lee | H04W 72/02 |
| 12,058,641 | B2* | 8/2024 | Lee | H04W 64/00 |
| 12,096,431 | B2* | 9/2024 | Belleschi | H04W 76/14 |
| 12,156,228 | B2* | 11/2024 | He | H04L 5/0092 |
| 12,160,911 | B2* | 12/2024 | Li | H04B 7/15 |
| 12,167,372 | B2* | 12/2024 | Park | H04L 1/08 |
| 12,219,480 | B2* | 2/2025 | Kwak | H04W 4/40 |
| 12,231,996 | B2* | 2/2025 | Adjakple | H04W 4/40 |
| 12,238,747 | B2* | 2/2025 | Belleschi | H04W 4/40 |
| 2014/0094212 | A1* | 4/2014 | Ahn | H04L 67/51 455/517 |
| 2016/0157080 | A1 | 6/2016 | Agiwal et al. | |
| 2016/0219620 | A1 | 7/2016 | Lee et al. | |
| 2017/0118671 | A1 | 4/2017 | Lee et al. | |
| 2018/0027398 | A1* | 1/2018 | Jung | H04L 67/51 455/434 |
| 2018/0132161 | A1 | 5/2018 | Lee et al. | |
| 2023/0022773 | A1* | 1/2023 | Leon Calvo | H04W 40/00 |
| 2023/0107139 | A1* | 4/2023 | Lu | H04W 48/20 370/329 |
| 2025/0039768 | A1* | 1/2025 | Kuo | H04W 40/246 |

FOREIGN PATENT DOCUMENTS

| | | | | |
|---|---|---|---|---|
| CN | 110832926 | A | | 2/2020 |
| CN | 111052855 | A | | 4/2020 |
| EP | 3091765 | A1 * | 11/2016 | ......... H04B 7/15507 |
| EP | 2382824 | B1 * | 5/2017 | ......... H04L 12/2809 |
| GB | 2507546 | A * | 5/2014 | ......... H04W 76/023 |
| WO | 2016054578 | A1 | | 4/2016 |
| WO | 2020032869 | A1 | | 2/2020 |
| WO | 2020056578 | A1 | | 3/2020 |
| WO | 2020069289 | A1 | | 4/2020 |

OTHER PUBLICATIONS

Ericsson: "On the NR Sidelink Discovery Procedures", G3GPP TSG-RAN WG1 Meeting #95, R1-1813642, Nov. 16, 2018 (Nov. 16, 2018), 3 Pages, section 3.
International Search Report and Written Opinion—PCT/CN2020/ 105784—ISA/EPO—Apr. 25, 2021-04-25.
Broadcom Corporation: "Discussion on L2 User Plane Configuration for D2D Communication and Discovery", 3GPP TSG-RAN WG2 Meeting #84, R2-134283 Prose_L2_Configuration, 3rd Generation Partnership Project, Mobile Competence Centre, 650, Route Des Lucioles, F-06921 Sophia-Antipolis Cedex, France, vol. RAN WG2, No. San Francisco, Nov. 11, 2013-Nov. 15, 2013, Nov. 1, 2013, 4 Pages, XP050753168, the whole document.
Supplementary European Search Report—EP20946794—Search Authority—Munich—Apr. 5, 2024.
3GPP: "3rd Generation Partnership Project, Technical Specification Group Radio Access Network, NR, Medium Access Control (MAC) Protocol Specification (Release 17)", 3GPP TS 38.321 V17.13.0, Jun. 2025, pp. 1-255.
3GPP: "3rd Generation Partnership Project, Technical Specification Group Radio Access Network, NR, NR and NG-RAN Overall Description, Stage 2 (Release 17)", 3GPP TS 38.300 V17.13.0, Jun. 2025, pp. 1-213.
3GPP: "3rd Generation Partnership Project, Technical Specification Group Services and System Aspects, Proximity Based Services (ProSe) in the 5G System (5GS) (Release 17)", 3GPP TS 23.304 V17.8.0, Sep. 2023, pp. 1-105.

* cited by examiner

USER PLANE PROTOCOL DESIGN FOR NEW RADIO (NR) SIDELINK DISCOVERY MESSAGE

CROSS-REFERENCE TO RELATED APPLICATION

This application is the U.S. national stage of PCT patent application number PCT/CN2020/105784 filed on Jul. 30, 2020.

TECHNICAL FIELD

The technology discussed below relates generally to wireless communication systems, and more particularly, to user plane protocol designs for use with a new radio (NR) sidelink discovery message.

INTRODUCTION

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

The ability to use sidelink for direct, one-to-one, communication between user equipment (UE) continues to be implemented with new models of UEs and continues to be implemented in public and private infrastructure. For example, sidelink is used in implementations of vehicle-to-everything (V2X) communication. In some network configurations, a first UE may be outside of an air interface coverage area of a base station yet may be in proximity with a second UE that is inside the air interface coverage area of the base station and has a connection with the base station. In such a situation, the second UE may act as a relay between the first UE and the base station. The first UE may use discovery procedures to discover the second UE, without assistance from the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of discovery in a wireless communication network is disclosed. The method includes determining to use a service associated with a sidelink communication, determining a contents of a discovery message including an indication of the message being the discovery message for the service, determining a sidelink resource for use to transmit the discovery message, and transmitting over a user plane using the determined sidelink resource the discovery message including the indication of the message being the discovery message for the service.

In another example, a user equipment (UE) in a wireless communication network is disclosed. The UE includes a wireless transceiver, a memory, and a processor communicatively coupled to the wireless transceiver and the memory. In one aspect, the processor and the memory are configured to determine to use a service associated with a sidelink communication, determine a contents of the discovery message including an indication of the message being the discovery message for the service, determine a sidelink resource for use to transmit the discovery message, and transmit over a user plane using the determined sidelink resource the discovery message including the indication of the message being the discovery message for the service.

In another example, a user equipment (UE) in a wireless communication network is disclosed. According to one aspect, the wireless communication device includes means for determining to use a service associated with a sidelink communication, means for determining a contents of the discovery message including an indication of the message being the discovery message for the service, means for determining a sidelink resource for use to transmit the discovery message, and means for transmitting over a user plane using the determined sidelink resource the discovery message including the indication of the message being the discovery message for the service.

In yet another example, an article of manufacture for use by a user equipment (UE) in a wireless communication network is disclosed. The article includes a non-transitory computer-readable medium having stored therein instructions executable by one or more processors of the UE. According to one aspect, the instructions include instructions to determine to use a service associated with a sidelink communication, determine a contents of the discovery message including an indication of the message being the discovery message for the service, determine a sidelink resource for use to transmit the discovery message, and transmit over a user plane using the determined sidelink resource the discovery message including the indication of the message being the discovery message for the service.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
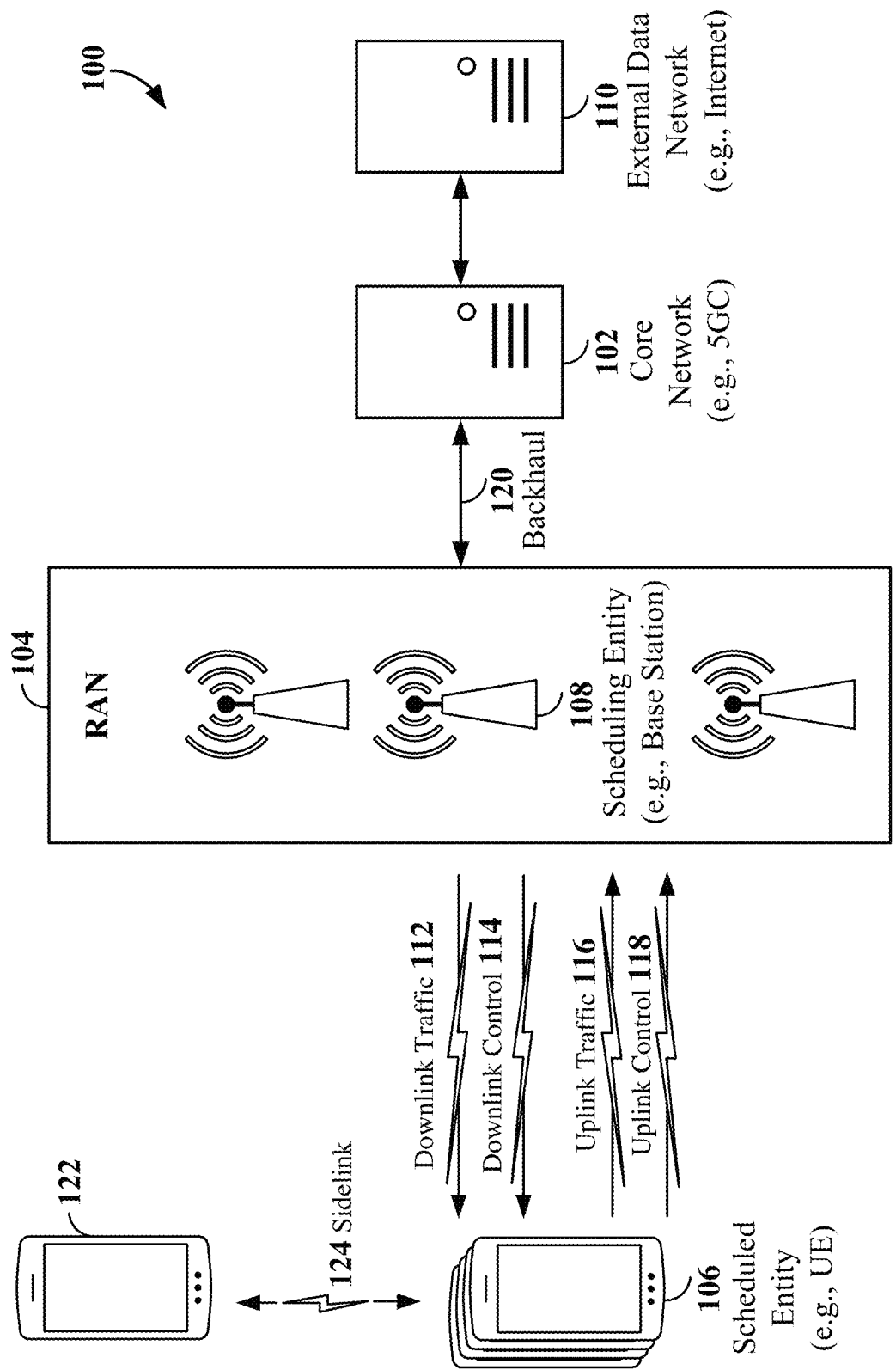
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

One example of an air interface used for direct, device-to-device (D2D) (e.g., UE-to-UE, one-to-one) discovery and communication is a PC5 interface. The PC5 interface is a reference point between Proximity-based Service (ProSe)-enabled UEs used for ProSe Direct Discovery and ProSe Direct Communication. ProSe Direct Discovery is a procedure employed by a ProSe-enabled UE to discover other ProSe-enabled UEs in its vicinity by using only the capabilities of the two UEs with Evolved Universal Terrestrial Radio Access (E-UTRA) technology. In comparison, ProSe Discovery is a process that identifies that a UE that is ProSe-enabled is in proximity of another, using E-UTRA or evolved packet core (EPC). ProSe Direct Communication is communication between two or more UEs in proximity that are ProSe-enabled, by means of user plane transmission using E-UTRA technology via a path not traversing any network node.

The PC5 interface may further be used for sidelink communication between UEs, within, for example, New Radio (NR) V2X. The PC5 interface may include three planes. A discovery plane of the PC5 interface (referred to herein as PC5-D) may be used for direct discovery by one UE of other UEs that are in proximity A signaling plane of the PC5 interface (referred to herein as PC5-S) may be used for control plane signaling over the PC5 interface to establish, maintain, and release a secure direct link between two UEs. A user plane of the PC5 interface (referred to herein as PC5-U) may be used to send user data directly between two UEs.

A protocol stack includes a stack of protocols, one atop another, that are used to support control plane and user plane functions between two or more entities. The entities may be, for example, UEs, base stations (e.g., eNB, gNB), serving gateways, packet data network gateways, or ProSe Functions. In some examples, various protocol stacks may, for example, control the configuration of ProSe-enabled UEs, control ProSe Direct Discovery, or control an exchange of user data between UEs. For example, a control plane protocol stack may be used for a PC5 Discovery (PC5-D) interface between two UEs. However, that protocol stack is defined only for the control plane. A user plane protocol stack for NR discovery between two UEs using a PC5 Discovery protocol may, for example, offer more discovery opportunities than might be available for discovery in the control plane. Presently; however, there is no user plane protocol stack for NR discovery.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE 106. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The RAN 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, antenna array modules, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to "Internet of Things" (IoT) systems and/or devices. A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-topoint transmission originating at a scheduled entity (described further below; e.g., UE 106).

In some examples, access to the air interface may be scheduled, wherein a scheduling entity (e.g., a base station 108) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations, represented in both the singular and the plural by scheduling entity 108, are not the only entities that may function as scheduling entities. That is, in some examples, a UE may function as a scheduling entity, scheduling resources for one or more scheduled entities (e.g., one or more other UEs). As discussed more below, UEs may communicate directly with other UEs in peer-to-peer fashion and/or in relay configuration. For example, UE 122 is illustrated communicating with UE 106 over a direct link signal (e.g., sidelink 124). Additional examples of direct link signals are provided in connection with FIG. 2.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control 114, including but not limited to scheduling information (e.g., a grant), synchronization or timing information, downlink control information (DCI), or other control information from another entity in the wireless communication network such as the scheduling entity 108.

In addition, the uplink and/or downlink control and/or traffic may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base station 108 may include a backhaul interface for communication with a backhaul 120 portion of the wireless communication system 100. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
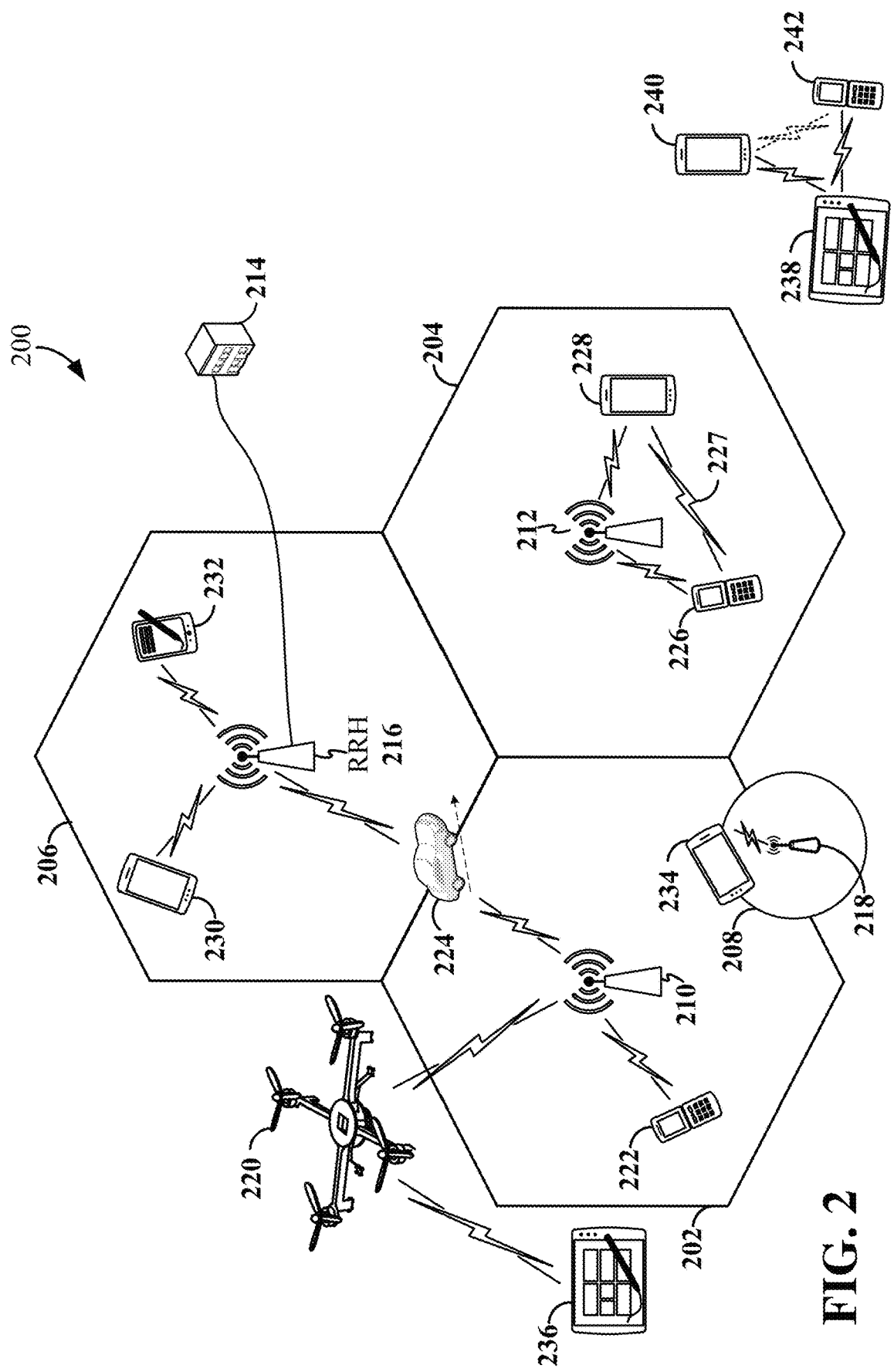
FIG. 2 is a schematic illustration of an example of a radio access network (RAN) according to some aspects of the disclosure.

FIG. 2 is a schematic illustration of an example of a radio access network (RAN) 200 according to some aspects of the disclosure. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various arrangements of base stations may be utilized. For example, in FIG. 2, two base stations 210 and 212 are shown in cells 202 and 204 and a third base station 214 is shown controlling a remote radio head (RRH) 216 in cell 206. That is, a base station can have an integrated antenna or can be connected to an antenna or RRH 216 by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as a quadcopter or drone 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE 106 described above and illustrated in FIG. 1.

In some examples, a mobile network node (e.g., an unmanned aerial vehicle (UAV) such as a quadcopter or drone 220) may be configured to function as a UE. For example, the quadcopter or drone 220 may operate within cell 202 by communicating with base station 210.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 200, the ability for a UE to communicate while moving, independent of its location, is referred to as mobility. The various physical channels between the UE and the RAN 200 are generally set up, maintained, and released under the control of an access and mobility management function (AMF, not illustrated, part of the core network 102 in FIG. 1), which may include a security context management function (SCMF) that manages the security context for both the control plane and the user plane functionality and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the network may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

As mentioned above in connection with FIG. 1, base stations are not the only entities that may function as a scheduling entity. That is, in some examples, a UE may function as a scheduling entity, scheduling resources for one or more scheduled entities (e.g., one or more other UEs). For example, UE 238 is illustrated communicating with UEs 240 and 242. In some examples, the UE 238 is functioning as a scheduling entity, while the UEs 240 and 242 may function as scheduled entities. In other examples, sidelink or other type of direct link signals may be communicated directly between UEs without necessarily relying on scheduling or control information from another entity. In one example, two or more UEs (e.g., UEs 226 and 228) may communicate with each other using direct link signals 227 (e.g., sidelink, Bluetooth, and/or other types of direct link signals) without relaying that communication through a base station (e.g., base station 212). In another example, UEs 238, 240, and 242 may communicate over a direct link in a device-to-device (D2D), peer-to-peer (P2P), vehicle-to-vehicle (V2V) network, vehicle-to-everything (V2X), and/or in a mesh network. In a mesh network example, UEs 240 and 242 may optionally communicate directly with one another in addition to communicating with a scheduling entity (e.g., UE 238).

In some examples, UE 238 may be a transmitting sidelink device that reserves resources on a sidelink carrier for the transmission of sidelink signals to UEs 240 and 242 in a D2D or V2X network. Here, UEs 240 and 242 are each receiving sidelink devices. UEs 240 and 242 may, in turn, reserve additional resources on the sidelink carrier for subsequent sidelink transmissions.

In other examples, UEs 238, 240, and 242 may be P2P devices (e.g., Bluetooth, Zigbee, or Near Field Communication (NFC) devices) communicating over a P2P carrier. For example, UEs 238, 240, and 242 may be Bluetooth devices that communicate over a short-wavelength (e.g., 2.45 GHz) carrier. Each Bluetooth device (e.g., UEs 238, 240, and 242) may operate at low power (e.g., 100 mW or less) to communicate over a short-range distance (e.g., 10 meters or less). In a Bluetooth network, the UEs 238, 240, and 242 may form an ad-hoc piconet and each pair of UEs (e.g., UEs 238 and 240; UEs 238 and 242; and UEs 240 and 242) may communicate over a different frequency in a frequency-hopping manner Within the piconet, one of the UEs (e.g., UE 238) may function as the master, while the other UEs (e.g., UEs 240 and 242) function as slaves. Each of the UEs 238, 240, and 242 may automatically detect and connect to one another.

In some examples, two or more UEs (e.g., UEs 226 and 228) within the coverage area of a serving base, such as base station 212, may communicate with both the base station 212 using cellular signals and with each other using direct link signals 227 (e.g., sidelink, Bluetooth, and/or other types of direct link signals) without relaying that communication through the base station 212. In an example of a V2X network within the coverage area of the base station 212, the base station 212 and/or one or both of the UEs 226 and 228 may function as scheduling entities to schedule sidelink communication between UEs 226 and 228.

Two primary technologies that may be used by V2X networks include dedicated short-range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to direct link (e.g., sidelink) networks other than V2X networks.

Figure 3:
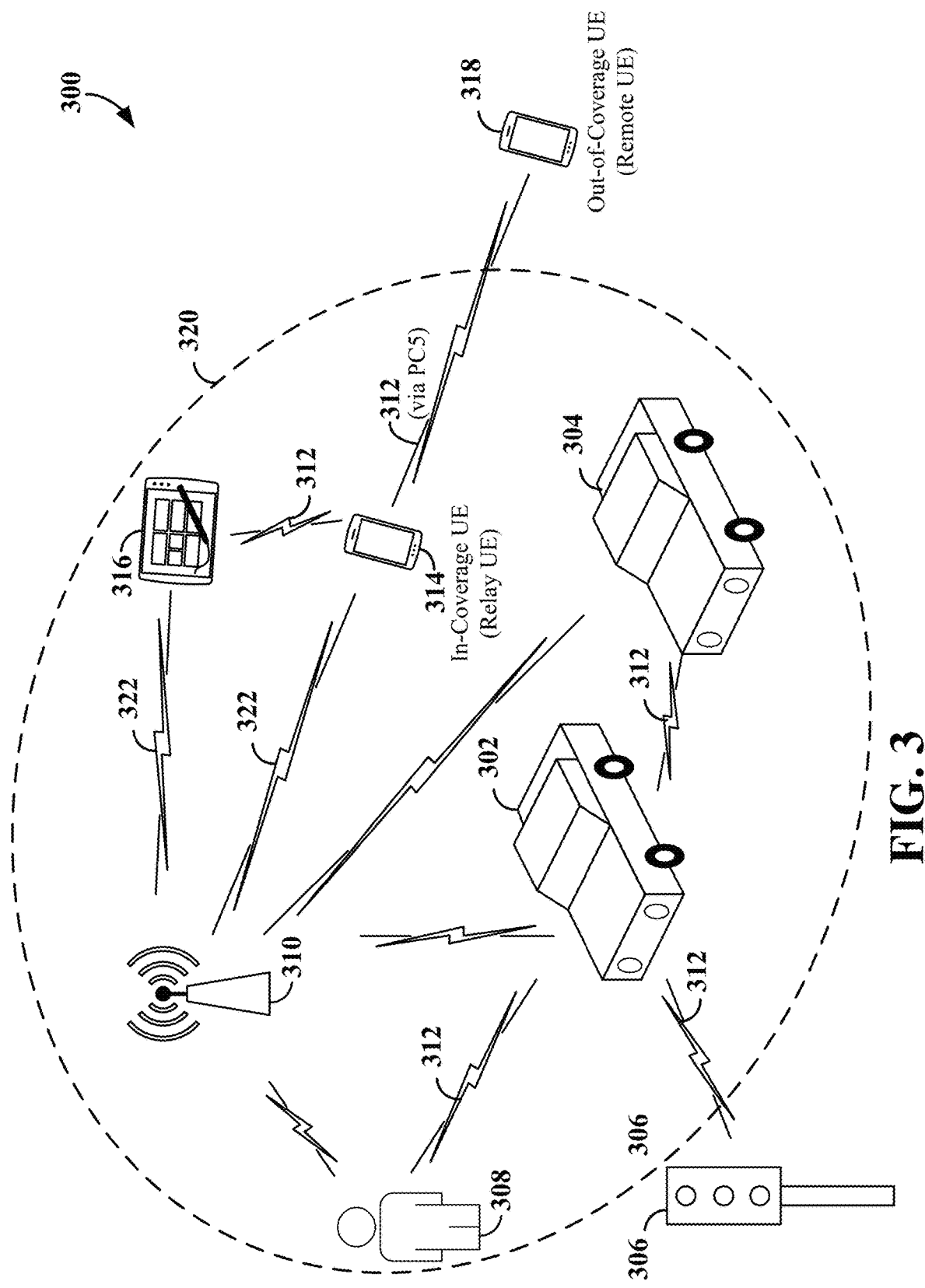
FIG. 3 is an illustration of an example of a wireless communication network configured to support direct communication, such as device-to-device (D2D) (e.g., sidelink) communication according to some aspects of the disclosure.

FIG. 3 is an illustration of an example of a wireless communication network 300 configured to support direct communication, such as device-to-device (D2D) (e.g., sidelink) communication according to some aspects of the disclosure. In some examples, sidelink communication may include V2X communication. V2X communication involves the wireless exchange of information directly between not only vehicles (e.g., vehicles 302 and 304) themselves, but also directly between vehicles 302/304 and infrastructure 306, such as streetlights, buildings, traffic cameras, tollbooths or other stationary objects, vehicles 302/304 and mobile devices of pedestrians/cyclists 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

A V2X transmission may include, for example, unicast transmissions, groupcast transmissions, and broadcast transmissions. Unicast describes a transmission, for example, from a vehicle (e.g., vehicle 302) to one other vehicle (e.g., vehicle 304). Groupcast arises when a group of UEs (e.g., vehicles 302 and 304) form a cluster. Data may be groupcasted within the cluster. Broadcast describes a transmission from, for example, a UE (e.g., vehicle 302) to surrounding receivers (e.g., vehicle 304, infrastructure 306 (e.g., an RSU), mobile devices of pedestrians/cyclists 308, the base station 310 of a network, or any combination thereof) in proximity to the transmitting UE.

V2X communication enable vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicles 302 and 304 or between a vehicle 302 or 304 and either infrastructure 306 or a pedestrian/cyclist 308 or between two UEs 314 and 318 occurs over a proximity service (ProSe) PC5 interface 312. In various aspects of the disclosure, the PC5 interface 312 or other direct interface may further be utilized to support D2D communication in other proximity use cases. Examples of other proximity use cases may include public safety or commercial (e.g., entertainment, education, office, medical, and/or interactive) based proximity services. In the example shown in FIG. 3, direct (e.g., ProSe) communication may occur between UEs 314 and 316 and between UEs 314 and 318.

ProSe communication may support different operational scenarios, such as in-coverage, out-of-coverage, and partial coverage. In FIG. 3, an air interface coverage area 320 of base station 310 is graphically represented by a dashed ellipsoid. Out-of-coverage refers to a scenario in which UE 318 is outside the air interface coverage area 320 of the base station 310 but is still configured for ProSe communication. Another example of an out-of-coverage scenario would be if UEs 314 and 316 were outside of the coverage area 320 of the base station 310, but each are still configured for ProSe communication (this coverage configuration is not illustrated in FIG. 3). Partial coverage refers to a scenario in which one of the UEs (e.g., UE 318) is outside of the air interface coverage area 320 (also referred to as the coverage area 320) of a base station (e.g., base station 310), while the other UE (e.g., UE 314) is within the coverage area 320 of the base station 310 and is in communication with the base station 310. The UEs 314 and 318 may communicate via sidelink over a PC5 312 interface. In such a configuration, UE 314 may be used as a relay UE to relay user data and control signal traffic to and from UE 318, which may be referred to as a remote UE. In-coverage refers to a scenario in which UEs 314 and 316 are in communication with the base station 310 (e.g., gNB) via a Uu 322 (e.g., cellular interface) connection to receive ProSe service authorization and provisioning information to support ProSe operations.

Figure 4:
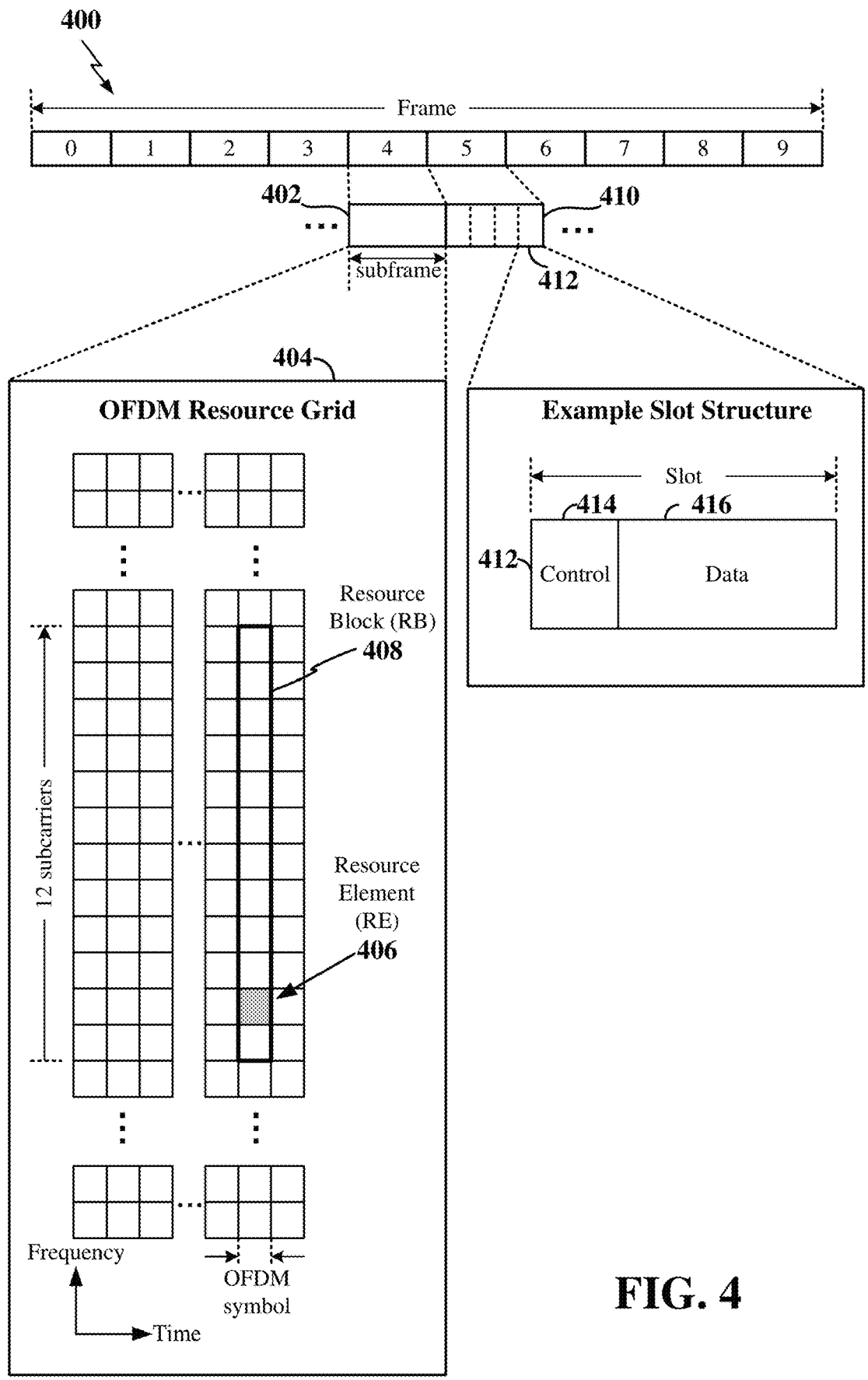
FIG. 4 is a schematic illustration of an organization of wireless resources in an air interface utilizing orthogonal frequency divisional multiplexing (OFDM) according to some aspects of the disclosure.

Various aspects of the present disclosure will be described with reference to an OFDM waveform, an example of which is schematically illustrated in FIG. 4. It should be understood by those of ordinary skill in the art that the various aspects of the present disclosure may be applied to a discrete Fourier transform-spread-OFDM (DFT-s-OFDM) with a CP (also referred to as single-carrier FDMA (SC-FDMA)) waveform in substantially the same way as described herein below. That is, while some examples of the present disclosure may focus on an OFDM link for clarity, it should be understood that the same principles may be applied as well to SC-FDMA waveforms.

Within the present disclosure, a frame refers to a duration of 10 ms for wireless transmissions, with each frame consisting of 10 subframes of 1 ms each. A transmission burst may include multiple frames. On a given carrier, there may be one set of frames in the UL, and another set of frames in the DL. Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (scheduled entities) for downlink or uplink transmissions typically involves scheduling one or more resource elements 406 within one or more sub-bands or bandwidth parts (BWPs). Thus, a UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the illustrative example shown in FIG. 4, one subframe 402 includes four slots 410. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened TTIs may in some cases be transmitted occupying resources scheduled for ongoing slot transmissions for the same or for different UEs. Any number of resource blocks may be utilized within a subframe or slot.

An expanded view of one of the slots 410 illustrates the slot 410 as including a control region 412 and a data region 414. In a first example of the slot 410, the control region 412 may carry control channels (e.g., a physical downlink control channel (PDCCH)) and the data region 414 may carry data channels (e.g., a physical downlink shared channel (PDSCH)). In a second example of the slot 410, the control region 412 may carry control channels (e.g., a physical uplink control channel (PUCCH)) and the data region 414 may carry data channels (e.g., a physical uplink shared channel (PUSCH)). Of course, a slot may contain all DL, all UL, or at least one DL portion and at least one UL portion. The structures illustrated in FIG. 4 are merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals, including but not limited to a demodulation reference signal (DMRS), a control reference signal (CRS), channel state information reference signal (CSI-RS), and/or a sounding reference signal (SRS). These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. As used herein, a broadcast communication is delivered to all devices, whereas a multicast communication is delivered to multiple intended recipient devices. A unicast communication may refer to a point-to-point transmission by a one device to a single other device.

In a DL transmission, a transmitting device (e.g., the base station/scheduling entity 108) may allocate one or more REs 406 (e.g., DL REs within the control region 412) to carry DL control information (DCI) including one or more DL control 114 channels that may carry information, for example, originating from higher layers, such as a physical broadcast channel (PBCH), a physical hybrid automatic repeat request (HARQ) indicator channel (PHICH), a physical downlink control channel (PDCCH), etc., to one or more scheduled entities (e.g., UE/scheduled entity 106). A Physical Control Format Indicator Channel (PCFICH) may provide information to assist a receiving device in receiving and decoding the PDCCH and/or Physical HARQ Indicator Channel (PHICH). The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. The PDCCH may carry downlink control 114, including downlink control information (DCI) for one or more UEs in a cell. This may include, but not limited to, power control commands, scheduling information, a grant, and/or an assignment of REs for DL and UL transmissions.

The base station may further allocate one or more REs 406 to carry other DL signals, such as a demodulation reference signal (DMRS); a phase-tracking reference signal (PT-RS); a positioning reference signal (PRS), a channel-stated information reference signal (CSI-RS); a primary synchronization signal (PSS); and a secondary synchronization signal (SSS). These DL signals, which may also be referred to as downlink physical signals, may correspond to sets of resource elements used by the physical layer but they generally do not carry information originating from higher layers. A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB 1. Examples of additional system information transmitted in the SIB1 may include, but are not limited to, a random access search space, downlink configuration information, and uplink configuration information. The MIB and SIB1 together provide the minimum system information (SI) for initial access.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

In an UL transmission, a transmitting device (e.g., a UE/scheduled entity 106) may utilize one or more REs 406, including one or more UL control 118 channels that may carry uplink control information (UCI) to the base station/scheduling entity 108, for example. UCI may include a variety of packet types and categories, including pilots, reference signals, and information configured to enable or assist in decoding uplink data transmissions. In some examples, the uplink control information may include a scheduling request (SR), i.e., request for the scheduling entity to schedule uplink transmissions. Here, in response to the SR transmitted on the uplink control 118 channel from the scheduled entity 106, the scheduling entity 108 may transmit downlink control information (DCI) that may schedule resources for uplink packet transmissions. UCI may also include HARQ feedback, such as an acknowledgment (ACK) or negative acknowledgment (NACK), channel state information (CSI), channel state feedback (CSF), or any other suitable UL control information (UCI). The UCI may originate from higher layers via one or more UL control channels, such as a physical uplink control channel (PUCCH), a physical random access channel (PRACH), etc. Further, UL REs 406 may carry UL physical signals that generally do not carry information originating from higher layers, such as demodulation reference signals (DMRS), phase-tracking reference signals (PT-RS), sounding reference signals (SRS), etc.

In addition to control information, one or more REs 406 (e.g., within the data region 414) may be allocated for user data traffic. Such traffic may be carried on one or more traffic channels, such as, for a DL transmission, a physical downlink shared channel (PDSCH), or for an UL transmission, a physical uplink shared channel (PUSCH). In some examples, one or more REs 406 within the data region 414 may be configured to carry SIBs (e.g., SIB1), carrying information that may enable access to a given cell.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The PSCCH may include HARQ feedback information (e.g., ACK/NACK) that may be used to indicate a need, or lack of need, for retransmissions on the sidelink. The data region 414 of the slot 410 may include a physical sidelink shared channel (PSSCH) including the data transmitted by the initiating (transmitting) sidelink device within resources reserved over the sidelink carrier by the transmitting sidelink device.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
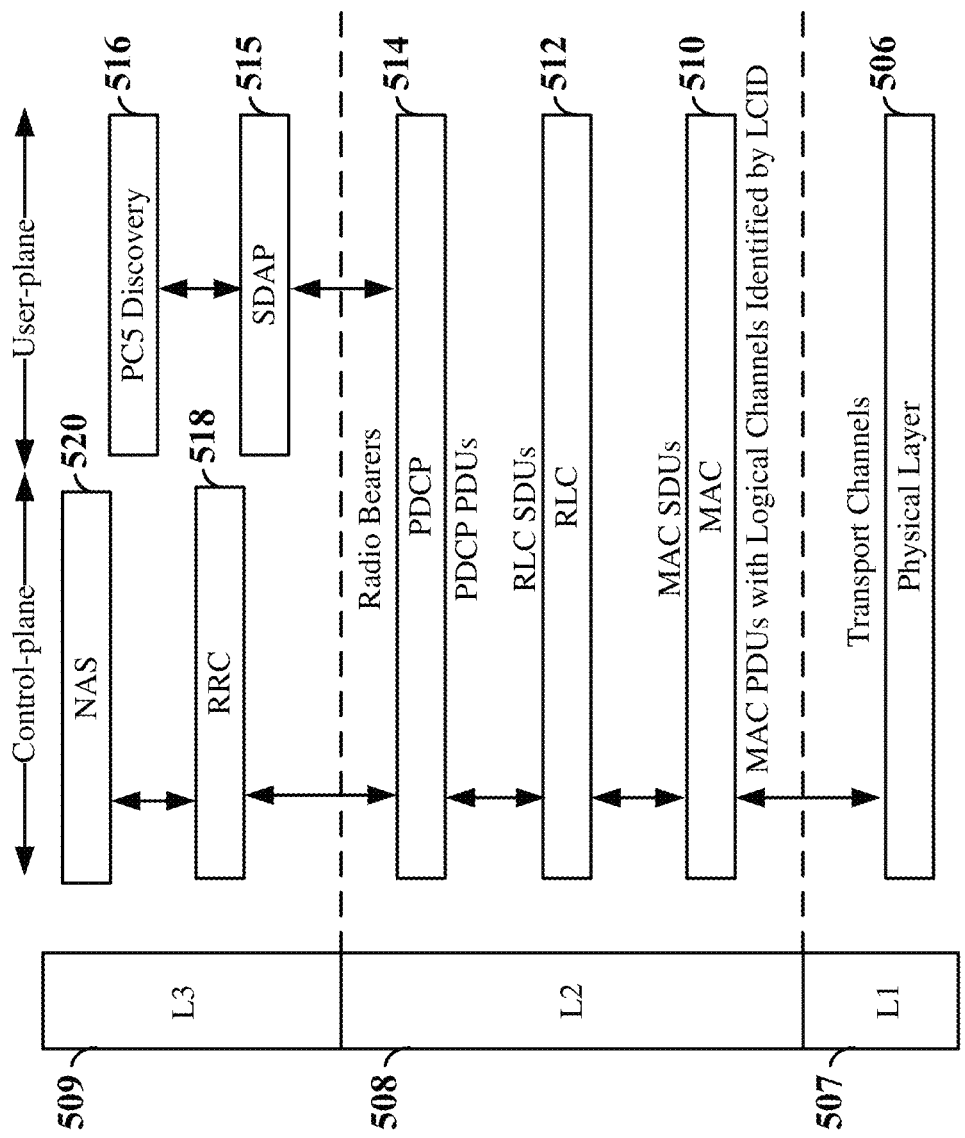
FIG. 5 is a diagram illustrating an example of a radio protocol architecture for the user and control planes according to some aspects of the disclosure.

FIG. 5 is a diagram illustrating an example of a radio protocol architecture for the user and control planes according to some aspects of the disclosure. As illustrated in FIG. 5, the radio protocol architecture for the UE and the base station includes three layers: layer 1 (L1), layer 2 (L2), and layer 3 (L3). L1 507 is the lowest layer and implements various physical layer signal processing functions. L1 507 will be referred to herein as the physical layer 506. L2 508 is above the physical layer 506 and is responsible for the link between the UE and base station over the physical layer 506.

In the user plane, the L2 layer 508 includes a medium access control (MAC) layer 510, a radio link control (RLC) layer 512, a packet data convergence protocol (PDCP) 514 layer, a service data adaptation protocol (SDAP) layer 815, and a PC5 Discovery layer 516, which are terminated at the base station on the network side. Although not shown, the UE may have several upper layers above the L2 layer 508 including at least one network layer (e.g., IP layer and user data protocol (UDP) layer) that is terminated at the User Plane Function (UPF) on the network side and one or more application layers.

According to aspects described herein, the PC5 Discovery layer 516 may serve, for example, as an application layer. The PC5 Discovery layer 516 may create (or provide) the content of the PC5 Discovery Message. The PC5 Discovery layer 516 may be a layer of a protocol stack of a user equipment (UE). In some examples, the SDAP layer 515 and the PC5 Discovery layer 516 may exist in a third layer, L3 509. As used herein, a discovery message created by the PC5 Discovery layer 516 may be referred to as a PC5 Discovery Message.

The SDAP layer 515 provides a mapping between a 5G core (5GC) quality of service (QoS) flow and a data radio bearer and performs QoS flow ID marking in both downlink and uplink packets. The PDCP layer 514 provides packet sequence numbering, in-order delivery of packets, retransmission of PDCP protocol data units (PDUs), and transfer of upper layer data packets to lower layers. PDUs may include, for example, Internet Protocol (IP) packets, Ethernet frames and other unstructured data (i.e., Machine-Type Communication (MTC), hereinafter collectively referred to as "packets"). The PDCP layer 514 also provides header compression for upper layer data packets to reduce radio transmission overhead, security by ciphering the data packets, and integrity protection of data packets. A PDCP context may indicate whether PDCP duplication is utilized for a unicast connection.

The RLC layer 512 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 512. The MAC layer 510 provides multiplexing between logical and transport channels. The MAC layer 510 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 506 is responsible for transmitting and receiving data on physical channels (e.g., within slots). MAC SDUs may be placed in MAC PDUs for transport over transport channels to the physical layer 506. A PHY context may indicate a transmission format and a radio resource configuration (e.g., bandwidth part (BWP), numerology, etc.) for a unicast connection.

In the control plane, the radio protocol architecture for the UE and base station is substantially the same for L1 506 and L2 508 with the exception that there is no PC5 Discovery layer in the control plane and there is no header compression function for the control plane. The control plane also includes a radio resource control (RRC) layer 518 in L3 and a higher Non-Access Stratum (NAS) layer 520. The RRC layer 518 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non Access Stratum (NAS). The RRC layer 518 is further responsible for QoS management, mobility management (e.g., handover, cell selection, inter-RAT mobility), UE measurement and reporting, and security functions. The NAS layer 520 is terminated at the AMF in the core network and performs various functions, such as authentication, registration management, and connection management.

The channels, carriers, and protocol layers described above and illustrated in FIGS. 1-5 are not necessarily all the channels, carriers, and protocol layers that may be utilized between a base station/scheduling entity 108 and UEs/scheduled entities 106, and those of ordinary skill in the art will recognize that other channels, carriers, and protocol layers may be utilized in addition to those illustrated, such as other traffic, control, and feedback channels.

In some examples, the PC5-D interface may interact with the MAC layer during discovery. For example, a UE may establish multiple logical channels. Each logical channel may be associated with a logical channel ID (LCID) that may uniquely identify a respective logical channel. According to some aspects a logical channel may transport the PC5 Discovery Message. In some examples, a value of an LCID may be used to identify a discovery message as a PC5 Discovery Message.

A PC5 enabled UE may utilize the PC5-D interface to broadcast or groupcast a discovery message advertising availability for PC-5 based communications to nearby UEs. The PC5 enabled UE may receive responses to the broadcast or groupcast discovery message from nearby UEs that are also PC5 enabled. The discovery message may be PC5 Discovery Messages. Described herein are aspects by which an out-of-coverage UE discovers an in-coverage UE for device-to-device (D2D) communication via an interface, such as the PC5-D interface (and vice versa).

As described with reference to FIG. 3, the term out-of-coverage UE (e.g., UE 318) refers to a UE that is out of network coverage, and therefore not in communication with a core network, such as a 5G core network, via a base station. Thus, the resources of the out-of-coverage UE are not scheduled by the base station. An out-of-coverage UE may be found, for example, where received signal strength of physical layer signals received in a downlink from and/or transmitted in an uplink to, a base station of the RAN have insufficient power to establish or maintain an RRC connection with the RAN. The insufficiency of power may be due, for example, to distance or blockage. An out-of-coverage UE may be found, for example, at a physical edge of a radio access network (RAN), where the distance from the base station to the edge of the physical edge of the RAN accounts for radio path loss. An out-of-coverage UE may be found, for example, within a building, subway, or mine, where the walls, roof, and floor of the building, subway, or mine block, and therefor attenuate, radio signals. Other examples of out-of-coverage UEs are within the scope of the disclosure. An out-of-coverage UE may be referred to as a remote UE herein.

The term in-coverage UE (e.g., UE 314) refers to a UE that is within the coverage of a network, and therefore, in communication with the core network via a base station. The in-coverage UE may be referred to as a relay UE herein. The remote UE (e.g., UE 318) may utilize a one-hop connection with the relay UE (e.g., UE 314) such that the relay UE serves as an intermediate node (e.g., a relay node) between the remote UE and the base station.

Figure 6:
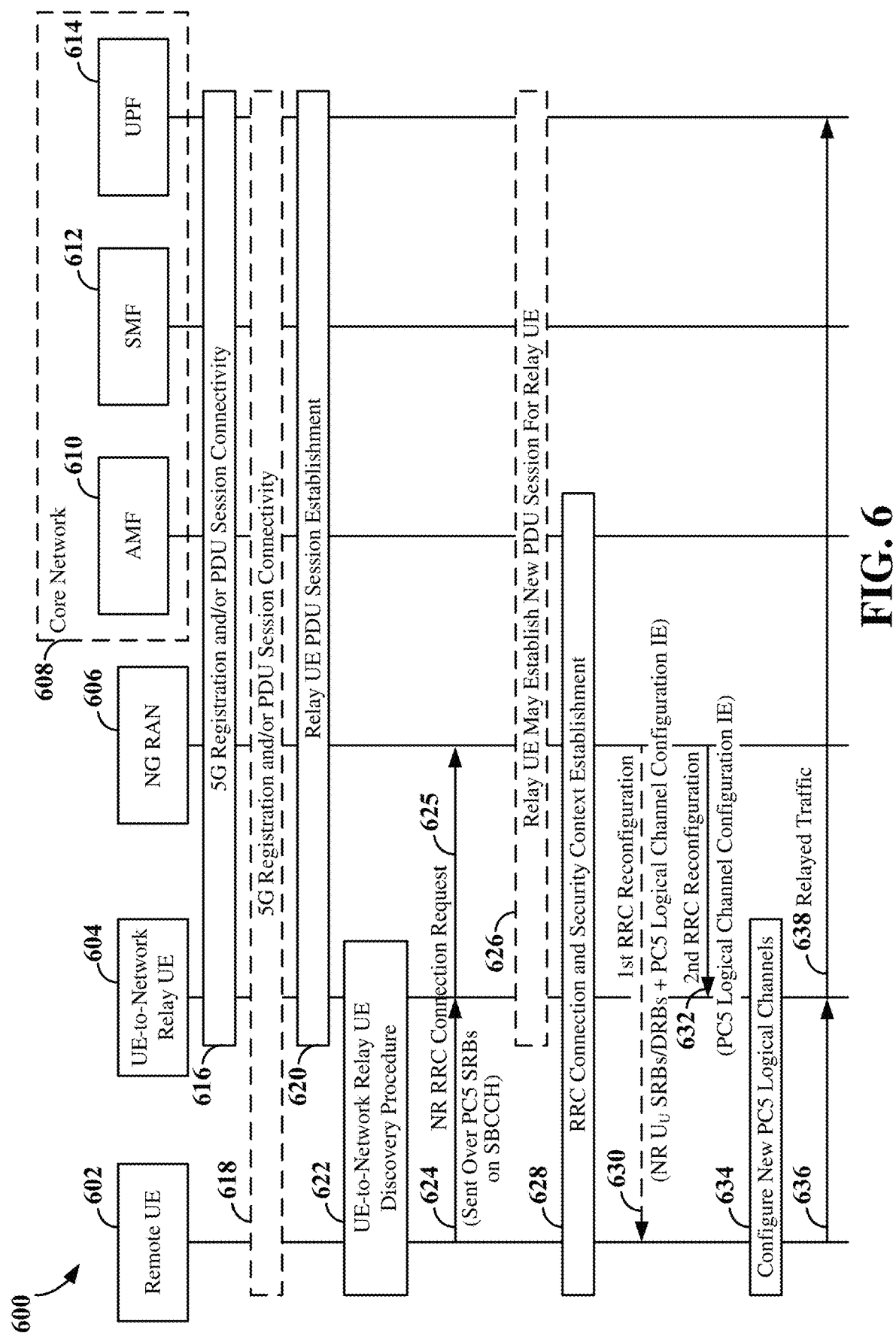
FIG. 6 is a call flow diagram illustrating a first relay procedure, referred to as a Layer 2 (L2) relay procedure according to some aspects of the disclosure.

There are at least two types of relay procedures that can be used by a remote UE to relay user data and control signals through a relay UE to and from a base station. FIG. 6 is a call flow diagram illustrating a first relay procedure, referred to as a Layer 2 (L2) relay procedure 600 according to some aspects of the disclosure. The entities depicted in FIG. 6 include the remote UE 602 and the UE-to-Network relay UE 604 (referred to herein as the relay UE 604). A base station is identified as, and referred to herein as, a next generation (NG) RAN 606. A gNB (not shown) may be encompassed by the NG RAN 606. A core network 608 is represented as including an access and mobility management function (AMF) 610, a session management function (SMF) 612, and a user plane function (UPF) 614. The AMF 610 and SMF 612 employ control plane (e.g., Non Access Stratum (NAS)) signaling to perform various functions related to mobility management and session management for the UEs 602 and 604. For example, the AMF 610 provides connectivity, mobility management and authentication of the UEs 602 and 604, while the SMF 612 provides session management of the UEs 602 and 604 (e.g., processes signaling related to protocol data unit (PDU) sessions between the UEs 602 and 604 and an external data network). The UPF 614 provides user plane connectivity to route 5G (NR) packets to/from the UEs 602 and 604 via the NG RAN 606. One of skill in the art understands that there are numerous additional nodes and/or functions encompassed by the core network 608. These numerous additional nodes/functions are not depicted to avoid cluttering the drawing.

The L2 relay procedure 600 may include, for example, 5G registration and/or establishment of PDU session connectivity by the relay UE 604 and core network 608 via the NG RAN 606. If the remote UE 602 is within the coverage area of the NG RAN 606, a similar aspect of 5G registration and/or establishment of PDU session connectivity 616 between the remote UE 602 and the core network 608 via the NG RAN 606 may occur. If the remote UE 602 is not within the coverage area of the NG RAN 606 (e.g., out-of-coverage), the 5G registration and/or establishment of PDU session connectivity 616 between the remote UE 602 and the core network via the NG RAN 606 may not occur; accordingly this feature is presented as optional in FIG. 6.

Following relay UE 604 5G registration and/or PDU session connectivity 616, the relay UE 604 may perform relay UE PDU session establishment 620 with the core network 608.

According to some aspects disclosed herein, the remote UE 602 may perform, or execute instructions to cause one or more circuits to perform, a UE-to-Network relay UE 604 discovery procedure 622. The UE-to-Network relay UE 604 discovery procedure 622 is described more fully in connection with FIGS. 8 and 9 herein. Exemplary implementations of the UE-to-Network relay UE 604 discovery procedure 622 are provided in connection with FIGS. 10-13 herein.

The remote UE 602 may send (e.g., transmit) an NR RRC connection request 624 to the relay UE 604. The NR RRC connection request 624 may be sent from the remote UE 602 to the relay UE 604 on a PC5 (also referred to herein as sidelink) interface over PC5 signaling radio bearers (SRBs) on a sidelink broadcast control channel (SBBCH). The relay UE 604 may in turn forward 625 the NR RRC connection request 624 to the NG RAN 606.

The relay UE 604 may optionally establish a new PDU session 626 for the relay node. The previous relay UE PDU session establishment 620 may not have been associated with the remote UE 602. The new PDU session may be associated with the remote UE 602.

Subsequently, further to the NR RRC connection request 624, the remote UE 602 may perform, or execute instructions to cause one or more circuits to perform, RRC connection and security context establishment 628 with the core network 608 via the relay UE 604 and NG RAN 606. The NG RAN 606 may send a first RRC reconfiguration message 630 to the remote UE 602. The first RRC reconfiguration message 630 may be conveyed via an NR Uu interface via signaling radio bearers (SRBs) and/or data radio bearers (DRBs) and may include a PC5 logical channel configuration information element (IE). The NG RAN 606 may send a second RRC reconfiguration message 632 to the relay UE 604. The second RRC reconfiguration message 632 may include a PC5 logical channel configuration information element (IE).

Following receipt of the logical channel configuration IEs from the NG RAN 606, the remote UE 602 and the relay UE 604 may each configure the PC5 logical channels over which user data and control signals may be conveyed. Accordingly, the remote UE 602 may send user data and control signals 636 (collectively traffic) to the relay UE 604 and the relay UE 604 may relay the traffic 638 to the UPF 614.

According to the L2 relay procedure 600, the remote UE 602 may not need to perform a PC5 unicast link setup procedure to establish a PC5 unicast link between the remote UE 602 and the relay UE 604 prior to relaying the traffic 638. In contrast, in an L3 relay procedure, explained with reference to FIG. 7 below, a PC5 unicast link setup procedure may be performed to obtain an IP address for the remote UE 602. According to the L2 relay procedure, the remote UE 602 sends the NR RRC configuration message on the PC5 interface over the SBCCH. The NG RAN 606 may indicate the PC5 access stratum (AS) configuration to the remote UE 602 and the relay UE 604 independently via the NR RRC reconfiguration messages. According to some aspects, changes to NR V2X PC5 stack operation may be implemented to support radio bearer handling in NR RRC/PDCP but not to support corresponding logical channels in a PC5 link According to some aspects, PC5 RLC may support direct interaction with NR PDCP. According to some aspects, the relay UE 604 may perform the L2 relaying.

Figure 7:
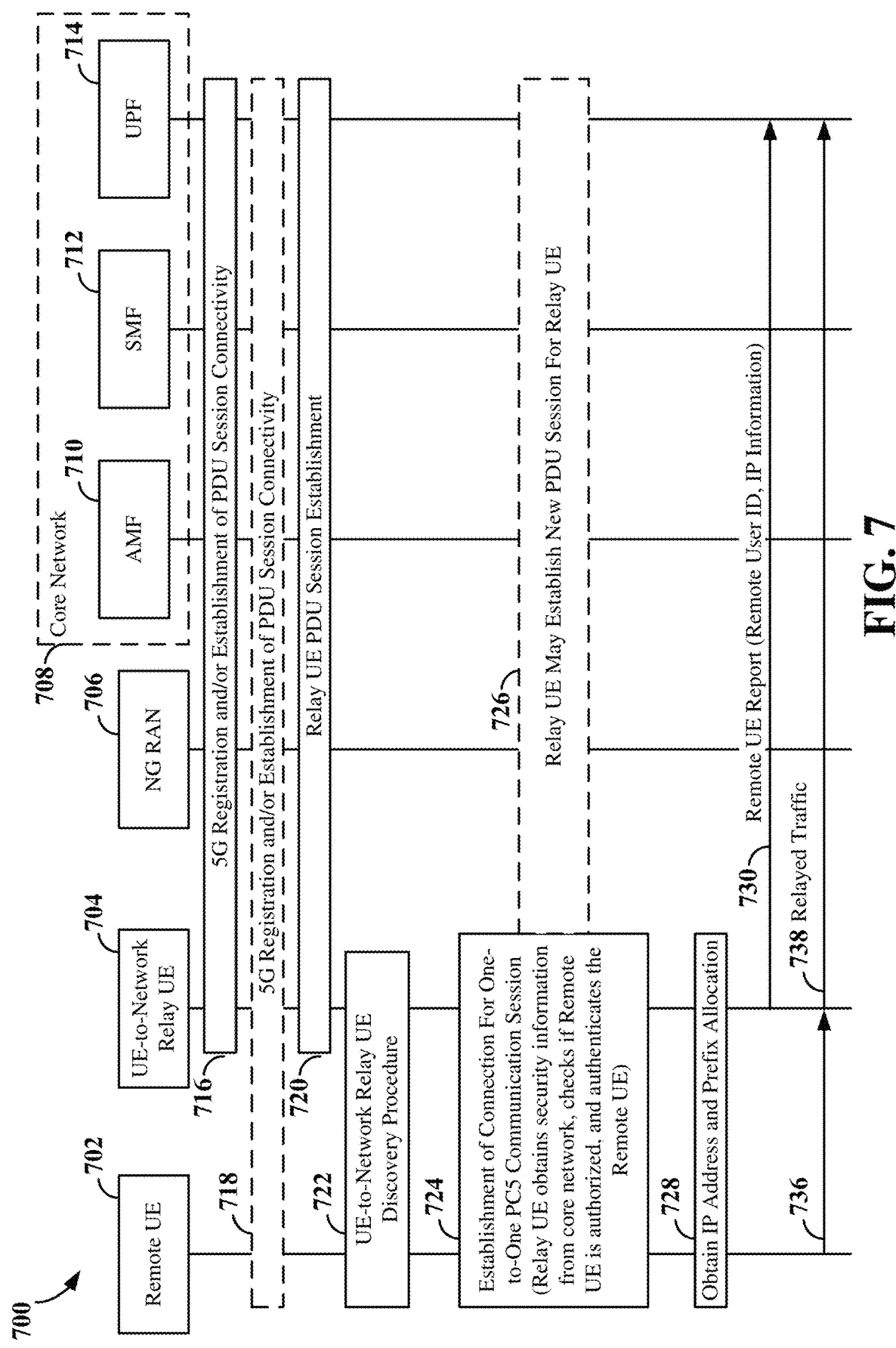
FIG. 7 is a call flow diagram illustrating a second relay procedure, referred to as a Layer 3 (L3) relay procedure according to some aspects of the disclosure.

FIG. 7 is a call flow diagram illustrating a second relay procedure, referred to as a Layer 3 (L3) relay procedure 700 according to some aspects of the disclosure. The entities depicted in FIG. 7 include a remote UE 702 and a UE-to-Network relay UE 704 (referred to herein as the relay UE 704). A base station is identified as, and referred to herein as, a next generation (NG) RAN 706. A gNB (not shown) may be encompassed by the NG RAN 706. A core network 708 is represented as including an AMF 710, an SMF 712, and a UPF 714, as described above. On of skill in the art understands that there are numerous additional nodes and/or functions encompassed by the core network 708. These numerous additional nodes/functions are not depicted to avoid cluttering the drawing.

The L3 relay procedure 700 may include, for example, 5G registration and/or establishment of PDU session connectivity by the relay UE 704 and core network 708 via the NG RAN 706. If the remote UE 702 is within the coverage area of the NG RAN 706, a similar aspect of 5G registration and/or establishment of PDU session connectivity 716 between the remote UE 702 and the core network 708 via the NG RAN 706 may occur. If the remote UE 702 is not within the coverage area of the NG RAN 706 (e.g., out-of-coverage), the 5G registration and/or establishment of PDU session connectivity 716 between the remote UE 702 and the core network 708 via the NG RAN 706 may not occur; accordingly this feature is presented as optional in FIG. 7.

Following relay UE 704 5G registration and/or establishment of PDU session connectivity 716, the relay UE 704 may perform relay UE PDU session establishment 720 with the core network 708.

According to some aspects disclosed herein, the remote UE 702 may perform, or execute instructions to cause one or more circuits to perform, a UE-to-network relay UE discovery procedure 722. The UE-to-network relay UE discovery procedure 722 is described more fully in connection with FIGS. 8 and 9 herein. Exemplary implementations of the UE-to-Network relay UE 704 discovery procedure 722 are provided in connection with FIGS. 10-13 herein.

According to some aspects, the remote UE 702 and the relay UE 704 may establish a connection for a direct, one-to-one, PC5 communication session at 724. In furtherance of this, the relay UE 704 may obtain security information from the core network 708, may check if the remote UE 702 is authorized, and may authenticate the remote UE 702.

The relay UE 704 may optionally establish a new PDU session 726 for the relay node. The previous relay UE PDU session establishment 720 may not have been associated with the remote UE 702. The new PDU session 726 may be associated with the remote UE 702.

The remote UE 702 and relay UE 704 may obtain an IP address and prefix allocation 728 to associate with the remote UE 702. Thereafter, the relay UE 704 may send a remote UE report 730 to the UPF 714. The remote UE report 730 may include, for example, a remote user ID and IP information of the remote UE 702. The remote UE 702 may send user data and control signals 736 (collectively traffic) to the relay UE 704 and the relay UE 704 may relay the traffic 738 to the UPF 714.

According to some aspects, a dedicated PDU session may be associated with one or more relay service codes. According to some aspects, the remote UE 702 may establish a PC5-S unicast link setup and obtain an IP address. A PC5-S unicast link access stratum (AS) configuration may be managed using PC5-RRC. The remote UE 702 and the relay UE 704 may coordinate on the AS configuration. The relay UE 704 may consider information from the NG RAN 706 to configure the PC5 unicast link. Authentication/authorization of the remote UE 702 to access a relaying feature of the relay UE 704 may be accomplished during PC5 unicast link establishment. According to some aspects, the relay UE 704 may perform the L3 relaying.

A communication system, such as 5G NR, may support direct discovery procedures where a first UE may discover one or more second UEs that may be in physical proximity to the first UE (and/or vice versa). Discovery of the first UE by the second UE (or vice versa) may be performed without direction from an NG RAN and without direction or use of features or function of a core network. Direct discovery messages may be sent over a device-to-device interface, such as an NR PC5-D interface. According to some aspects described herein, the direct discovery messages may be sent over an NR PC5-D interface between the first and second UEs. According to some examples, the first UE may be a remote UE (e.g., an out-of-coverage UE without a connection to a network) and the second UE may be a relay UE (e.g., an in-coverage UE with a connection to a network). Upon discovery of the relay UE by the remote UE, or discovery of the remote UE by the relay UE, the pair of UEs may be configured for one-to-one communication therebetween. The relay UE may relay user data and control signaling (collectively referred to as traffic) of the remote UE to the core network via a RAN base station (e.g., an eNB, a gNB).

There may be two direct discovery models, referred to herein as Model A and Model B. The Model A discovery model involves a first UE sending an announcement discovery message on a PC5 channel. In Model A direct discovery, for example, a remote UE (e.g., the first UE) may announce its presence to one or more other UEs. The other UEs may be monitoring, for example, a PSCCH or a PSSCH for a Model A announcement discovery message sent from the remote UE. The Model A discovery message may be a PC5 Discovery Message.) The remote UE may be referred to as an announcing UE while the other UEs may be referred to as monitoring UEs. Any one or more of the monitoring UEs may be a relay UE. A relay UE may be a UE that has a network connection and may therefore serve as a relay node to a remote UE that has no network connection (e.g. an out-of-coverage UE). The Model A discovery message (also referred to herein as an announcement discovery message) may be sent from the announcing UE (e.g., the remote UE) to the monitoring UE(s) (e.g., one or more relay UEs) in a broadcast or a groupcast announcement discovery message. More particularly, the broadcast or groupcast discovery message may include a medium access control (MAC) header or subheader that contains a parameter whose value indicates that the sender is a PC5 enabled UE. The PC5-D interface may interact with a MAC layer during PC5 discovery.

The Model B discovery model involves a first UE sending a solicitation discovery message on a PC5 channel. In Model B direct discovery, for example, a remote UE (e.g., the first UE) may seek to discover the presence of one or more other UEs. The other UEs may be monitoring, for example, a PSSCH for a Model B discovery message sent from the remote UE. The Model B discovery message may be a PC5 Discovery Message. The remote UE may be referred to as a discoverer UE while the other UEs may be referred to as discoveree UEs. Any one or more of the discoveree UEs may be a relay UE. The Model B discovery message (also referred to as a solicitation discovery message) may be sent from the discoverer UE (e.g., the remote UE) to the discoveree UE(s) (e.g., one or more relay UEs) in a broadcast or a groupcast announcement discovery message. More particularly, the broadcast or groupcast discovery message may include a medium access control (MAC) header or subheader that contains a parameter whose value indicates that the sender is a PC5 enabled UE. A response to a Model B discovery solicitation may be unicast/broadcast.

According to aspects described herein, the PC5 Discovery Message (e.g., the announcement discovery message of Model A and the solicitation discovery message of Model B) may be carried in the PSSCH in the user plane. A separate physical discovery channel (e.g., physical sidelink discover channel (PSDCH) as in LTE) may not be needed. Furthermore, no modification of the PHY layer is needed to implement the features and aspects described herein.

According to some aspects, the content, and/or the security, of the PC5 Discovery Message may be allocated in a 5G direct discovery name management function (referred to herein as DDNMF), for example. As known to those of skill in the art, the DDNMF may be a network node that may be used for open ProSe Direct Discovery to allocate and process the mapping of ProSe Applications IDs and ProSe Application Codes used in ProSe Direct Discovery. The DDNMF may use ProSe related subscriber data stored in a home subscriber server (HSS) for authorization for each discovery request. The DDNMF may also provide a UE with the necessary security material in order to protect discovery messages transmitted over the air. According to some aspects, the DDNMF may be included in, for example, a home public land mobile network (HPLMN) ProSe Function, a visitor public land mobile network (VPLMN) ProSe Function, or a local public land mobile network (PLMN) ProSe Function.

Figure 8:
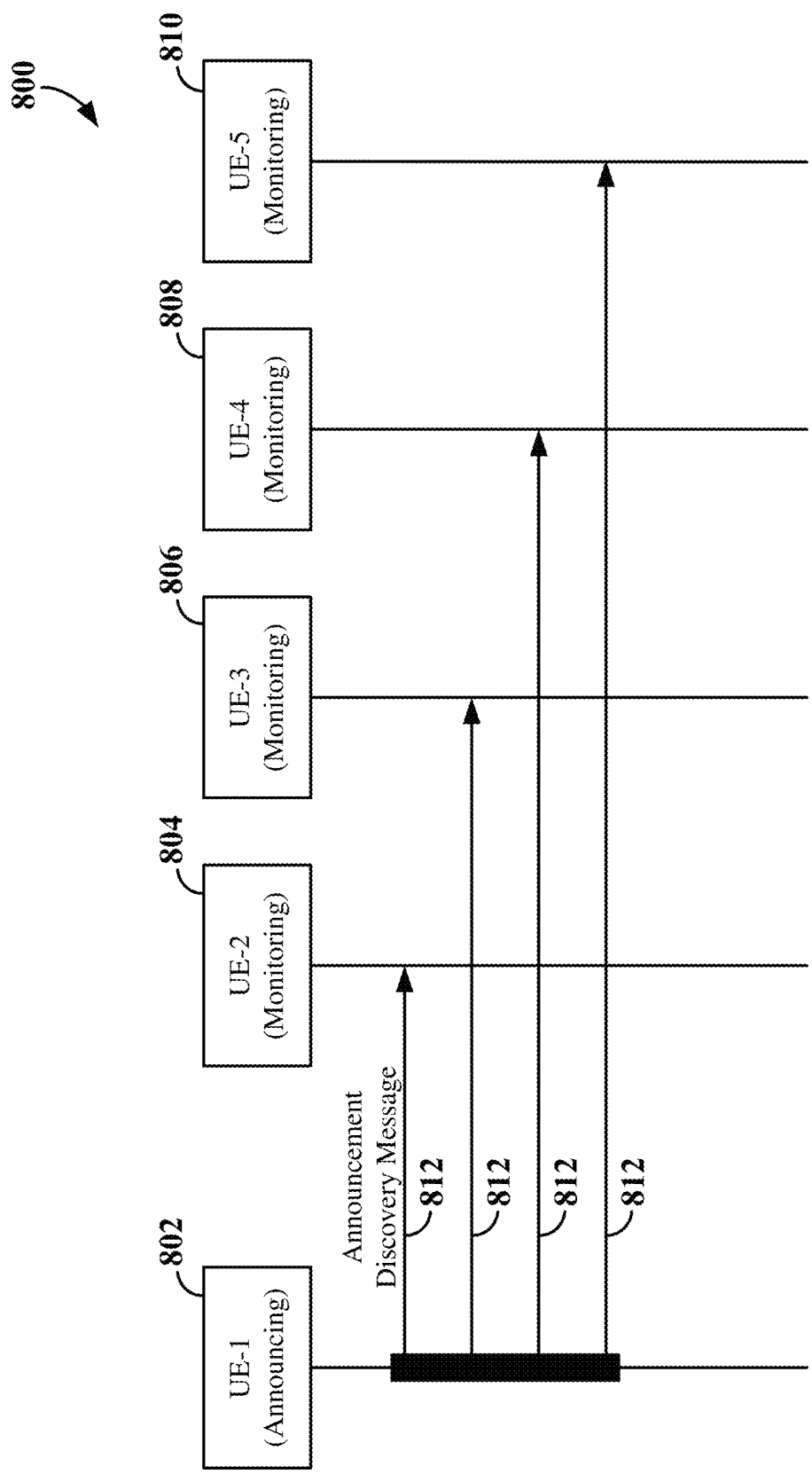
FIG. 8 is a call flow diagram depicting a Model A discovery process according to some aspects of the disclosure.

FIG. 8 is a call flow diagram depicting a Model A discovery procedure 800 according to some aspects of the disclosure. According to the Model A discovery procedure, a first UE 802 (UE-1, an announcing UE) transmits an announcement discovery message 812 to a plurality of neighboring UEs 804-810 (UE-2 through UE-5, monitoring UEs). The announcement discovery message 812 may be a PC5 Discovery Message. The first UE 802 may be a remote UE that is out-of-coverage of any base station, and therefor out of coverage of any network accessed via a base station. Any one or more of the plurality of neighboring UEs 804-810 may be a relay UE, which is within the coverage of a base station (and therefore of a network via the base station) and can relay user data and control signals (collectively traffic) between the remote UE and the network.

Figure 9:
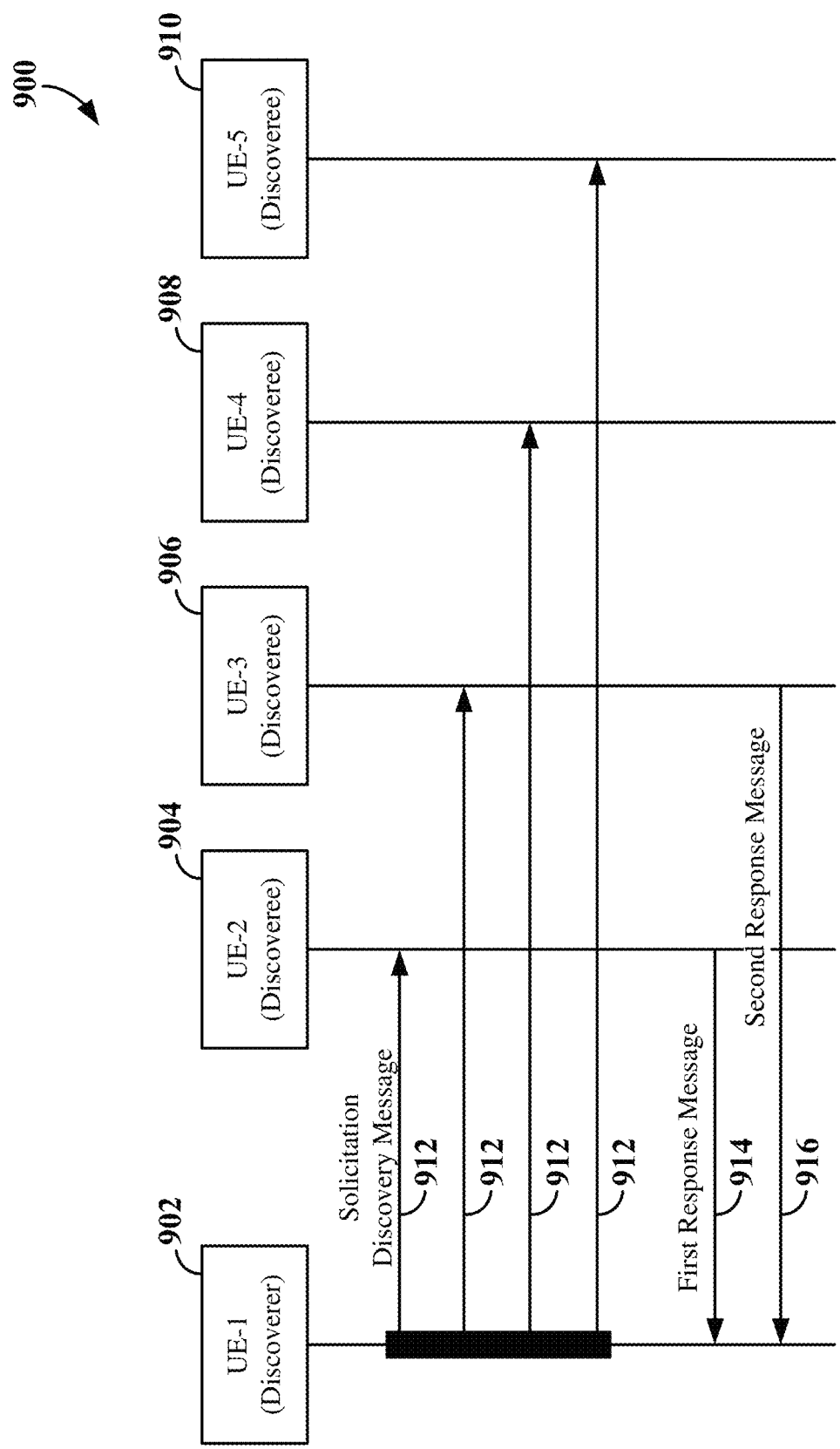
FIG. 9 is a call flow diagram depicting a Model B discovery process 800 according to some aspects of the disclosure.

FIG. 9 is a call flow diagram depicting a Model B discovery procedure 900 according to some aspects of the disclosure. According to the Model B discovery procedure, a first UE 902 (UE-1, a discoverer UE) transmits a solicitation discovery message 912 to a plurality of neighboring UEs 904-910 (UE-2 through UE-5, discoveree UEs). The solicitation discovery message 912 may be a PC5 Discovery Message. The first UE 802 may be a remote UE that is out-of-coverage of any base station, and therefore out of coverage of any network accessed via a base station. Any one or more of the plurality of neighboring UEs 904-910 may be a relay UE, which is within the coverage of a base station (and therefore of a network via the base station) and can relay user data and control signals (collectively traffic) between the remote UE and the network. Of the four neighboring UEs 904-910 that receive the solicitation discovery message 912, two of the UEs (UE-2 904 and UE-3 906), respond to the solicitation. UE-2 904 responds with a first response discovery message 914, and UE-3 906 responds with a second response discovery message 916. Each response discovery message may be a response PC5 Discovery Message.

Figure 10:
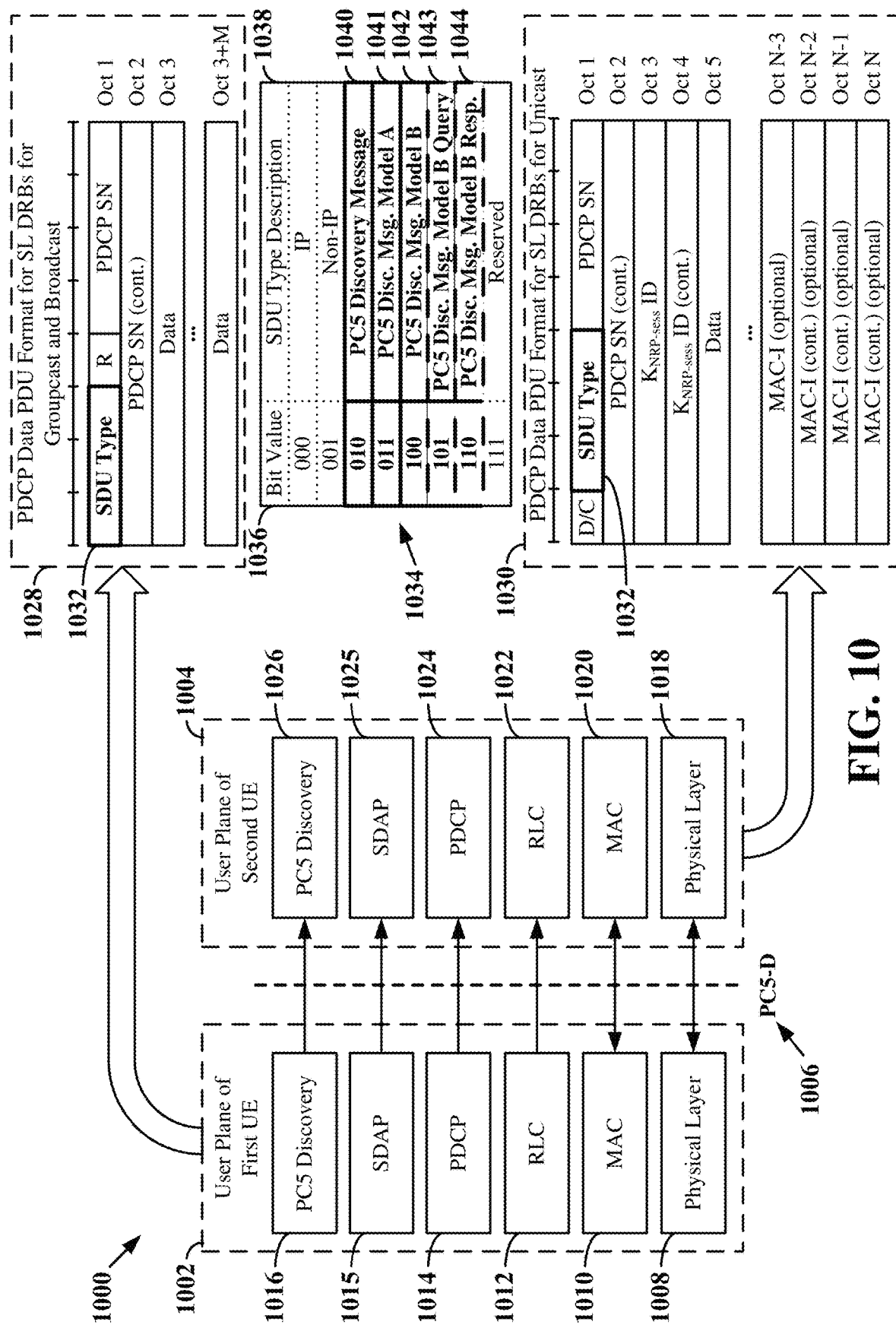
FIG. 10 is a diagram depicting a first pair of user plane protocol stacks of a first UE and a second UE along with an exemplary first data structure and an exemplary second data structure according to some aspects of the disclosure.

FIG. 10 is a diagram depicting a first pair of user plane protocol stacks (referred to individually and collectively as protocol stack 1000) of a first UE 1002 and a second UE 1004 along with an exemplary first data structure 1028 and an exemplary second data structure 1030 according to some aspects of the disclosure. Each of the first data structure 1028 and the second data structure 1030 may include a parameter indicative of a discovery message according to some aspects of the disclosure. The discovery message may be a PC5 Discovery Message. The first UE 1002 may be exemplified by remote UE 318 of FIG. 3, remote UE 602 of FIG. 6, remote UE 702 of FIG. 7, UE-1 802 of FIG. 8, and/or UE-1 902 of FIG. 9. The second UE 1004 may be exemplified by relay UE 314 of FIG. 3, UE-to-Network relay UE 604 of FIG. 6, UE-to-Network relay UE 704 of FIG. 7, UE-2 804 of FIG. 8, and/or UE-2 802 of FIG. 9. The user plane protocol stacks 1000 are depicted with a PC5-D interface 1006 therebetween, also according to some aspects of the disclosure.

In the example of FIG. 10, the first data structure 1028 is depicted as a packet data convergence protocol (PDCP) data packet data unit (PDU) formatted for sidelink (SL) data radio bearers (DRBs) for groupcast and broadcast messages (and for the sidelink SRB 0 message), while the second data structure 1030 is depicted as a PDCP data PDU formatted for sidelink (SL) data radio bearers (DRBs) for unicast messages. A common parameter between the first data structure 1028 and the second data structure 1030 is a service data unit (SDU) Type 1032 parameter. These data structures have not been used, heretofore, for PC5 Discovery Messages (e.g., for sidelink discovery messages).

FIG. 10 also includes a table 1034 that provides a cross-reference between bit values 1036 of the SDU Type 1032 parameter and SDU Type description 1038. Use of the PDCP data PDU formatted for SL DRBs for groupcast and broadcast messages and the PDCP data PDU formatted for SL DRBs for unicast messages, along with their common use of an SDU Type 1032 parameter field is non-limiting. Other data structures related to the same or different data units conveyed between the same or different protocol layers, with the same or different common parameters, or without common parameters, are within the scope of the disclosure.

The user plane protocol stack 1000 of the first UE 1002 includes (at a lowest layer, L1, not shown) a physical layer 1008 (otherwise referred to as the PHY layer). The user plane protocol stack 1000 of the first UE 1002 further includes a medium access control (MAC) layer 1010 over the physical layer 1008, a radio link control (RLC) layer 1012 over the MAC layer 1010, and a PDCP layer 1014 over the RLC layer 1012. The MAC layer 1010, RLC layer 1012, and PDCP layer 1014 may exist in a second layer, L2, not shown (see, e.g., L2 508 of FIG. 5). The user plane protocol stack 1000 of the first UE 1002 further includes an SDAP layer 1015 over the PDCP layer 1014 and a PC5 Discovery layer 1016 over the SDAP layer 1015. The PC5 Discovery layer 1016 may exist in a Non Access Stratum (NAS) layer. The SDAP layer 1015 provides a mapping between a 5G core (5GC) quality of service (QoS) flow and a data radio bearer and performs QoS flow ID marking in both downlink and uplink packets.

Similar to the first UE 1002, the user plane protocol stack 1000 of the second UE 1004 includes (at the lowest layer, L1, not shown) a physical layer 1018 (otherwise referred to as the PHY layer). The user plane protocol stack 1000 of the second UE 1004 further includes a MAC layer 1020 over the physical layer 1018, an RLC layer 1022 over the MAC layer 1020, and a PDCP layer 1024 over the RLC layer 1022. The MAC layer 1020, RLC layer 1022, and PDCP layer 1024 may exist in a second layer, L2, not shown (see, e.g., L2 508 of FIG. 5). The user plane protocol stack 1000 of the second UE 1004 further includes an SDAP layer 1025 over the PDCP layer 1024 and a PC5 Discovery layer 1026 over the SDAP layer 1025.

The first data structure 1028 and the second data structure 1030, represented in the example of FIG. 10 as the PDCP data PDU formatted for SL DRBs for groupcast and broadcast messages and the PDCP data PDU formatted for SL DRBs for unicast messages, respectively, may be described as bit strings that are byte aligned (i.e. multiple of 8 bits, an octet) in length. The bit strings are represented with the most significant bit being the leftmost bit of the first row and the least significant bit being the rightmost bit on the last row, and more generally the bit string is to be read from left to right and then in the reading order of the rows. The bit order of each parameter field within the first data structure 1028 and the second data structure 1030 is represented with the first and most significant bit in the leftmost bit and the last and least significant bit in the rightmost bit. In the examples of the first data structure 1028, there are 3+M rows of octets of bits, where M is a positive integer that is greater than 0. In the example of the second data structure 1030, there are N rows of octets of bits, where N is a positive integer that is greater than or equal to 9. Other data structures, including the same or different number of bits in the same or different number of bits per row and the same or different number of rows are within the scope of the disclosure.

The first data structure 1028 may be used, for example, for broadcast and/or groupcast of a discovery message of the Model A type and a discovery message of the Model B type. Each discovery message may be a PC5 Discovery Message. The first data structure 1028 may also be used, for example, for a broadcast response discovery message in response to the solicitation discovery message of the Model B type. The second data structure 1030 may be used, for example, for a unicast response discovery message in response to a broadcast and/or groupcast solicitation discovery message of the Model B type.

Both the first data structure 1028 and the second data structure 1030 include a first parameter that may be indicative of a discovery message. The discovery message may be a PC5 Discovery Message. An example of the first data structure 1028 and the second data structure 1030 is a PDCP data PDU. A first parameter indicative of the discovery message may be PDCP service data unit (SDU) Type 1032 parameter. The SDU Type 1032 parameter is included in both examples of the first data structure 1028 and the second data structure 1030. The PDCP SDU Type may be a Layer-3 PDU Type. The type of an SDU may be useful because a PDCP entity may handle the SDU differently based on its SDU Type 1032.

According to aspects described herein, an SDU Type 1032 that is indicative of a discovery message may be implemented through use of available bit values 1036 associated with the SDU Type 1032. The discovery message 1040 may be a PC5 Discovery Message 1040. The bit values 1036 may be available if, for example, the bit values were reserved for a future use. For example, according to some specifications, a bit value 1036 of "000" corresponds to an IP SDU Type, a bit value 1036 of "001" corresponds to a non-IP SDU Type, while bit values in the range of "010"-"111" were reserved for future use. According to some aspects of the disclosure, the previously reserved bit value 1036 of "010" may be used to indicate that the PDCP data PDU carrying this value, as the SDU Type 1032, indicates that a discovery message associated with the PDCP data SDU is a PC5 Discovery Message 1040. According to the example of FIG. 10, a transmission over the user plane of a PDCP data PDU formatted for SL DRBs for groupcast and broadcast messages (e.g., in accordance with the first data structure 1028) with the value "010" in the SDU Type 1032 field, may be used to indicate transmission of a PC5 Discovery Message (e.g., an announcement and/or solicitation discovery message) from a remote UE (e.g., the first UE 1002) to neighboring UEs (represented individually and collectively by the second UE 1004). Furthermore, a transmission over the user plane of a PDCP data PDU formatted for SL DRBs for unicast messages (e.g., in accordance with the second data structure 1030) with the value "010" in the SDU Type 1032 field, may be used to indicate that a response PC5-Discovery Message 1040 is being transmitted from a relay UE (e.g., second UE 1004) to a soliciting remote UE (e.g., first UE 1002). The SDU Type 1032 field may be populated with other values. For example, a value of 011 may indicate that the discovery message is a PC5 discovery message of the model A type 1041. A value of 100 may indicate that the discovery message is a PC5 discovery message of the model B type 1042. A value of 101 may indicate that the discovery message is a PC5 discovery message of the model B type and corresponds to a model B query message 1043, while a value of 110 may indicate that the discovery message is a PC5 discovery message of the model B type and corresponds to a model B response message 1044. The three-bit value of an SDU Type parameter in the first data structure 1028 and/or the second data structure 1030, to indicate a presence of a PC5 Discovery Message 1040, a PC5 discovery model A type 1041, a PC5 discovery model B type 1042, a PC5 discovery model B type corresponding to a model B query message 1043, and/or a PC5 discovery model B type corresponding to a model B response message 1044 is exemplary and non-limiting. According to some aspects, any or all of the information conveyed by the value of the SDU Type may be additionally or alternatively conveyed in a header associated with the PDCP data PDU from a higher protocol level (compared to the PDCP protocol level). Accordingly, some of the bit values 1036 and SDU Type descriptions 1038 may be optional, such as, for example, use of the bit value 101 to represent the PC5 discovery model B type corresponding to a model B query message 1043, and/or the bit value 110 to represent the PC5 discovery model B type corresponding to a model B response message 1044. The higher protocol layer may be, for example, the PC5 Discovery protocol layer 1026. The same or different parameter, having the same or different number of bits, having the same or different value, is within the scope of the disclosure. Furthermore, the use of a PDCP data PDU to carry the indication of a PC5 Discovery Message 1040 is exemplary and non-limiting; other data PDUs, SDUs, or other formations of bits are within the scope of the disclosure. A discovery message, including any of the discovery messages mentioned herein, may be transmitted over the user plane in a physical sidelink shared channel (PSSCH), for example. According to one example, the discovery message carried in the PSSCH may be specified in 3GPP Release 16 new radio (NR) V2X. A separate discovery physical channel (e.g., a physical sidelink discovery channel (PSDCH) in LTE) is not required.

Additional parameters represented in the first data structure 1028 include reserved (R) bits, a PDCP sequence number (SN) (12 bits presented in Octets 1-2), and data (in the remaining octets). The R bit may be reserved for future use and may be ignored by a receiver. The PCDP SN bits may be configured by upper layers to be either 12 or 18 bits in length. In the example of FIG. 10, the PDCP SN has 12 bits. A length of 12 bits may indicate unacknowledged mode (UM) data radio bearers (DRBs), acknowledged mode (AM) DRBs, and SRBs (including sidelink DRBs and sidelink SRBs). A length of 18 bits, not shown, may indicate UM DRBs, AM DRBs (including sidelink DRBs for unicast). According to some aspects, for NR sidelink communication for groupcast and broadcast, only the 12 bits PDCP SN length is used for the sidelink DRBs. The R parameter field, PDCP SN parameter field, and data field are not provided with reference numbers to avoid cluttering the drawing.

The parameters represented in the second data structure 1030 include the PDCP service data unit (SDU) Type 1032. The SDU Type 1032 was described above, the description will not be repeated for the sake of conciseness. Additional parameters represented in the second data structure 1030 include a PDCP sequence number (SN) (12 bits presented in Octets 1-2). The PCDP SN bits may be configured by upper layers to be either 12 or 18 bits in length. The description of the PDCP SN provided above in connection with the first data structure 1028 applies to the PDCP SN of the second data structure 1030.

Additional parameters represented in the second data structure 1030 also include a D/C parameter, a key referred to as the $K_{NRP\text{-}sess}$ ID, and a message authentication code for integrity (MAC-I) parameter. The D/C parameter may indicate whether the corresponding PDCP PDU is a PDCP Data PDU or a PDCP Control PDU. The $K_{NRP\text{-}sess}$ ID parameter is specified in TS 33.536. For an SL DRB that does not need integrity and ciphering protection, the UE may set the $K_{NRP\text{-}sess}$ ID value to "0" in the PDCP data PDU header. The MAC-I field carries a message authentication code. For sidelink SRB1, SRB2, and SRB3, the MAC-I field may be present only when the sidelink SRB1, SRB2, and SRB3 are configured with integrity protection. The D/C parameter field, PDCP SN parameter field, $K_{NRP\text{-}sess}$ ID parameter filed, MAC-I parameter field, and data field are not provided with reference numbers to avoid cluttering the drawing.

With regard to priority handling, a relay UE, such as the second UE 1004 may need to prioritize the transmission of messages over the PC5 interface. According to aspects described herein, there may be at least two examples of ways to handle prioritization of messages (e.g., priority of a PC5-D message in comparison to a PC5-S message). In one example, if more than one message is available for transmission by the relay node, a PC5 Discovery Message 1040 transported on a physical sidelink shared channel (PSSCH), as described herein, may have a lower priority than another message transmitted on the PSSCH. According to one example, the PC5 Discovery Message transported on a PSSCH has a lowest priority among messages transmitted on the PSSCH. According to another example, a PC5 Discovery Message transported on a sidelink traffic channel (STCH) has a lower priority than another message transmitted on the PSSCH. According to another example, messages among sidelink traffic channels (STCHs) may be prioritized in at least one of two alternatives. According to a first alternative, prioritization may be performed in accordance with the priority of the logical channel (LCH) transporting the discovery message, for example as configured in RRC. According to a second alternative, the priority of the discovery message may be a highest priority among messages transported on the STCH. In some examples, the priority of the discovery message may be fixed as being a highest priority among messages transported on the STCH. In other words, the priority of a PC5 Discovery Message is at least one of: based on a logical channel (LCH) priority of a logical channel transporting the discovery message, or fixed to be a highest priority among messages transported on the STCH. In all examples and alternatives, the discovery message may be a PC5 Discovery Message.

Figure 11:
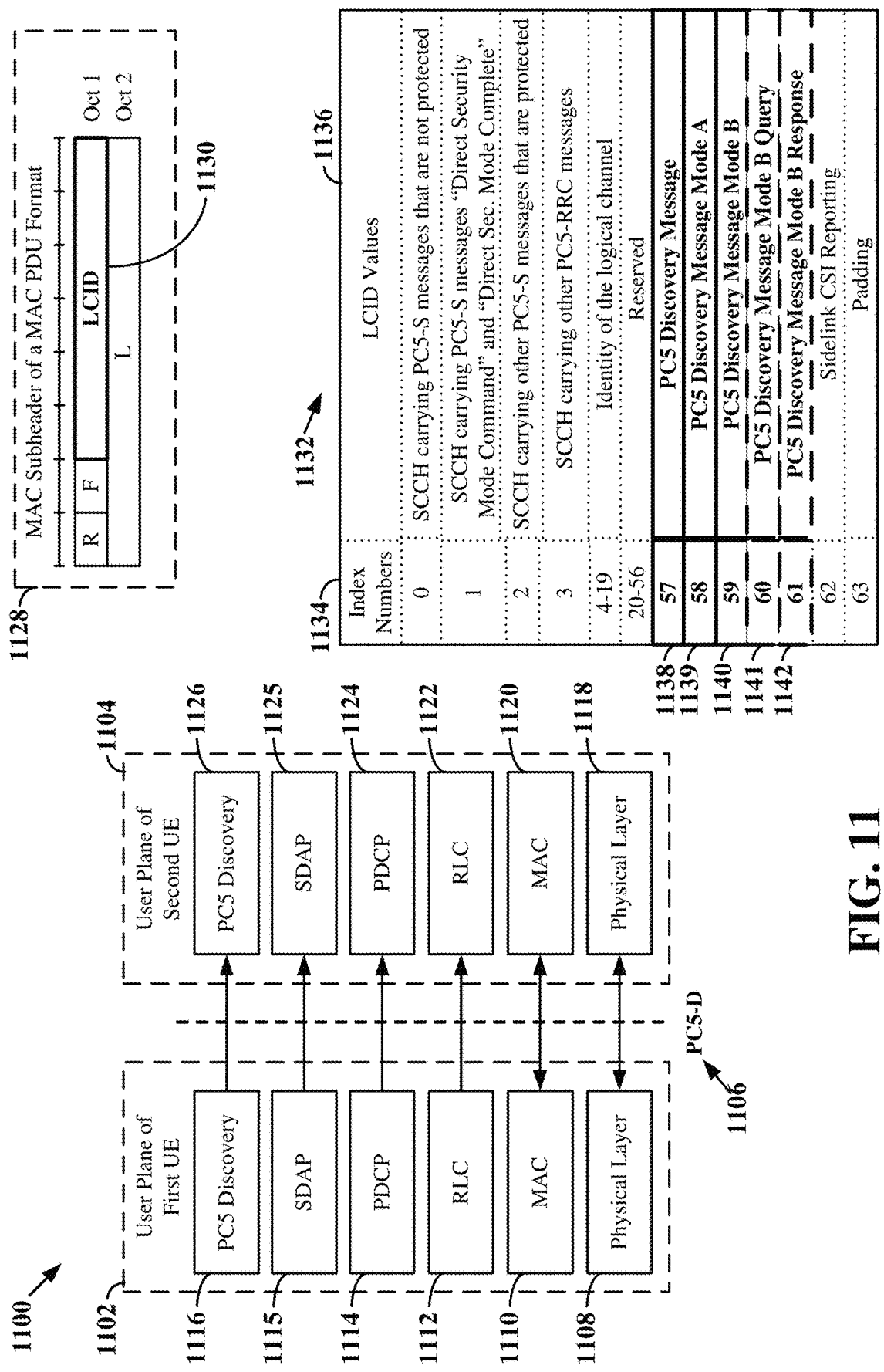
FIG. 11 is a diagram depicting a second pair of user plane protocol stacks of a first UE and a second UE along with an exemplary third data structure according to some aspects of the disclosure.

FIG. 11 is a diagram depicting a second pair of user plane protocol stacks (referred to individually and collectively as protocol stack 1100) of a first UE 1102 and a second UE 1104 along with an exemplary third data structure 1128 according to some aspects of the disclosure. The third data structure 1128 may include a parameter indicative of a discovery message according to some aspects of the disclosure. The first UE 1102 may be exemplified by remote UE 318 of FIG. 3, remote UE 602 of FIG. 6, remote UE 702 of FIG. 7, UE-1 802 of FIG. 8, and/or UE-1 902 of FIG. 9. The second UE 1104 may be exemplified by relay UE 314 of FIG. 3, UE-to-Network relay UE 604 of FIG. 6, UE-to-Network relay UE 704 of FIG. 7, UE-2 804 of FIG. 8, and/or UE-2 904 of FIG. 9. The user plane protocol stacks 1100 are depicted with a PC5-D interface 1106 therebetween, also according to some aspects of the disclosure.

In the example of FIG. 11, the third data structure 1128 is depicted as MAC subheader with an 8-bit LCID field. The MAC subheader is part of a MAC PDU. A MAC subheader may be a bit string that is byte aligned (e.g., multiple of 8 bits, an octet) in length. Each MAC subheader may be placed immediately in front of a corresponding MAC SDU, MAC CE, or padding. A MAC PDU is a bit string that is byte aligned (i.e. multiple of 8 bits) in length. In the third data structure 1128, bit strings are represented in which the most significant bit is the leftmost bit of the first line of the third data structure 1128, the least significant bit is the rightmost bit on the last line of the third data structure 1128, and more generally the bit string is to be read from left to right and then in the reading order of the lines. The bit order of each parameter field within a MAC PDU is represented with the first and most significant bit in the leftmost bit and the last and least significant bit in the rightmost bit. A MAC SDU is a bit string that is byte aligned (i.e. multiple of 8 bits) in length. A MAC SDU is included into a MAC PDU from the first bit onward. A MAC CE is a bit string that is byte aligned (i.e. multiple of 8 bits) in length. The third data structure 1128 has not been used, heretofore, for PC5 Discovery Messages (e.g., for sidelink discovery messages).

The user plane protocol stack 1100 of the first UE 1102 includes (at a lowest layer, L1, not shown) a physical layer 1108 (otherwise referred to as the PHY layer). The user plane protocol stack 1100 of the first UE 1102 further includes a medium access control (MAC) layer 1110 over the physical layer 1108, a radio link control (RLC) layer 1112 over the MAC layer 1110, and a PDCP layer 1114 over the RLC layer 1112. The MAC layer 1110, RLC layer 1112, and PDCP layer 1114 may exist in a second layer, L2, not shown (see, e.g., L2 508 of FIG. 5). The user plane protocol stack 1100 of the first UE 1102 further includes an SDAP layer 1115 over the PDCP layer 1114 and a PC5 Discovery layer 1116 over the SDAP layer 1115. The PC5 Discovery layer 1016 may exist in a non-access stratum (NAS) layer. The SDAP layer 1015 provides a mapping between a 5G core (5GC) quality of service (QoS) flow and a data radio bearer and performs QoS flow ID marking in both downlink and uplink packets. The SDAP layer 1115 and the PC5 Discovery layer 1116 may exist in a third layer, L3, not shown (see, e.g., L3 509 of FIG. 5).

Similar to the first UE 1102, the user plane protocol stack 1100 of the second UE 1104 includes (at the lowest layer, L1, not shown) a physical layer 1118 (otherwise referred to as the PHY layer). The user plane protocol stack 1100 of the second UE 1104 further includes a medium access control (MAC) layer 1120 over the physical layer 1118, a radio link control (RLC) layer 1122 over the MAC layer 1120, and a PDCP layer 1124 over the RLC layer 1122. The MAC layer 1120, RLC layer 1122, and PDCP layer 1124 may exist in a second layer, L2, not shown (see, e.g., L2 508 of FIG. 5). The user plane protocol stack 1100 of the second UE 1104 further includes an SDAP layer 1125 over the PDCP layer 1124 and a PC5 Discovery layer 1126 over the SDAP layer 1125.

As mentioned, the third data structure 1128 (e.g., the MAC subheader) may be described as bit strings that are byte aligned (i.e. multiple of 8 bits, an octet) in length. The bit strings are represented with the most significant bit being the leftmost bit of the first row and the least significant bit being the rightmost bit on the last row, and more generally the bit string is to be read from left to right and then in the reading order of the rows. The bit order of each parameter field within the third data structure 1128 is represented with the first and most significant bit in the leftmost bit and the last and least significant bit in the rightmost bit. In the example of the third data structure 1128, there are 2 rows of octets of bits which corresponds to 16 total bits. Other data structures, including the same or different number of bits in the same or different number of bits per row and the same or different number of rows are within the scope of the disclosure.

The third data structure 1128 may be used, for example, to convey a discovery message of the Model A type (e.g., an announcement discovery message) and a discovery message of the Model B type (e.g., a solicitation discovery message). The third data structure 1128 includes a logical channel identification (LCID) field 1130. The LCID field 1130 may be used to indicate the identity of the logical channel to which the MAC subheader applies. In examples described herein, the LCID field 1130 may be used to indicate that the discovery message may be a PC5 Discovery Message 1138. In the exemplary third data structure 1128, the length of the LCID field is 6 bits. According to aspects described herein, an index number 1134 may be indicative of the PC5 Discovery Message 1138. The use of an index number 1134 for this purpose may be implemented through use of available index numbers 1134 of the MAC subheader (e.g., of the third data structure 1128). The index number 1134 may be available if, for example, the index number 1134 was reserved for a future use. For example, according to some specifications, index numbers "4"-"19" correspond to identities of logical channels, while index numbers "20"-"61" were reserved for future use. According to some aspects of the disclosure, the previously reserved index number 1134 of "57" may be used to indicate that a MAC PDU, including the MAC subheader (e.g., the third data structure 1128) of FIG. 11, having an index number 1134 of "57" is indicative of the PC5 Discovery Message 1138. Use of a different reserved index number, such as "21" is within the scope of the disclosure. According to the example of FIG. 11, a transmission over the user plane of a MAC PDU formatted with the MAC subheader (e.g., formatted with the third data structure 1128) with the value "57" in the LCID field 1130, may be used to indicate transmission of the PC5 Discovery Message 1138 (e.g., an announcement and/or a solicitation discovery message) from a remote UE (e.g., the first UE 1102) to neighboring UEs (represented individually and collectively by the second UE 1104). Furthermore, a transmission over the user plane of a MAC PDU formatted with the MAC subheader (e.g., formatted with the third data structure 1128) with the value "57" in the LCID field 1130, may be used to indicate that a PC5-D Discovery response message is being transmitted from a relay UE (e.g., second UE 1104) to a soliciting remote UE (e.g., first UE 1102).

The LCID 1130 field may be populated with other index numbers 1134. For example, an index value of 58 may indicate that the discovery message is a PC5 discovery message of the model A type 1139. An index value of 59 may indicate that the discovery message is a PC5 discovery message of the model B type 1140. An index value of 60 may indicate that the discovery message is a PC5 discovery message of the model B type and corresponds to a model B query message 1141, while an index value of 57 may indicate that the discovery message is a PC5 discovery message of the model B type and corresponds to a model B response message 1142. The illustrated index values of the LCID 1130 parameter in the third data structure 1128, to indicate a presence of a PC5 Discovery Message 1138, a PC5 discovery model A type 1139, a PC5 discovery model B type 1140, a PC5 discovery model B type corresponding to a model B query message 1141, and/or a PC5 discovery model B type corresponding to a model B response message 1142 is exemplary and non-limiting. According to some aspects, any or all of the information conveyed by the value of the SDU Type may be additionally or alternatively conveyed in a header associated with the PDCP data PDU from a higher protocol level (compared to the PDCP protocol level). Accordingly, some of the index number values 1134 and LCID value descriptions 1136 may be optional, such as, for example, use of the index value 60 to represent the PC5 discovery model B type corresponding to a model B query message 1141, and/or the index value 61 to represent the PC5 discovery model B type corresponding to a model B response message 1142. The higher protocol layer may be, for example, the PC5 Discovery protocol layer 1126. The six-bit LCID parameter and the use of the illustrated index numbers to represent various PC5 discovery message types/configurations is exemplary and non-limiting. The same or different parameter, having the same or different value and/or number of bits is within the scope of the disclosure. Furthermore, the use of a MAC subheader of a MAC PDU to carry the indication of the PC5 Discovery Message is exemplary and non-limiting; other data PDUs, SDUs, headers, and/or subheaders or other formations of bits are within the scope of the disclosure.

Additional parameters represented in the third data structure 1128 include a reserved (R) bit, an F bit, and an L field (8 bits presented in Octets 2). The R bit may be reserved for future use and may be ignored by a receiver. The F bit represents a format field, which indicates the size of the Length (L) field. According to some aspects, there is one F field per MAC subheader except for subheaders corresponding to the SL-SCH subheader or padding. The size of the F field is 1 bit. The value 0 indicates 8 bits of the Length (L) field. The value 1 indicates 16 bits of the L field. The L field is a length field that indicates the length of the corresponding MAC SDU in bytes. According to some aspects, there is one L field per MAC subheader except for subheaders corresponding to the SL-SCH subheader or padding. The size of the L field is indicated by the F field. The R parameter field, F parameter field, and L parameter field are not provided with reference numbers to avoid cluttering the drawing.

FIG. 11 also includes a table 1132 that provides a cross-reference between index numbers 1134 and LCID values 1136 related to the LCID field 1130 presented in the third data structure 1128 (e.g., the MAC subheader). A unique index number 1134 and LCID value 1136 are depicted in the seventh row of the table 1132; namely, the LCID value 1136 that may correspond to PC5 Discovery Message 1138 may be indexed to index number "61." Accordingly, a transmission over the user plane of a MAC PDU having a MAC subheader with an index number "61" in the LCID field 1130 may be used to indicate that a PC5 Discovery Message (e.g., an announcement and/or a solicitation discovery message) is being transmitted from a remote UE to neighboring UEs. Furthermore, a transmission over the user plane of a MAC PDU having a MAC subheader with an index number "61" in the LCID field 1130 may be used to indicate that a response PC5 Discovery Message 1138 is being transmitted from a relay UE to a soliciting remote UE. The index number "61" to indicate an LCID value 1136 of PC5 Discovery Message 1138 in the third data structure 1128 is exemplary and non-limiting. Other values of the same or other parameters in the exemplary third data structure 1128 or of any other MAC subheader is within the scope of the disclosure.

The priority handling of messages configured using the third data structure 1128 is the same or similar to priority handling of messages configured using the first data structure 1028 of FIG. 10 and the second data structure 1030 of FIG. 10; accordingly, the description of priority handling is omitted for the sake of conciseness. However, when compared to priority handling of messages configured using the first data structure 1028 of FIG. 10 and the second data structure 1030 of FIG. 10, priority handling of messages configured using the third data structure 1128 of FIG. 11 may provide more flexibility on priority configuration of the discovery message. For example, the discovery message may be associated with any of the reserved index numbers (e.g., 20-61). The priority of index number 21 may be configured to be higher than the priority of index 61; accordingly, a greater selection of priority levels may be realized using the third data structure of FIG. 11, when more than one LCID value is being used to indicate a PC5 Discovery Message.

Figure 12:
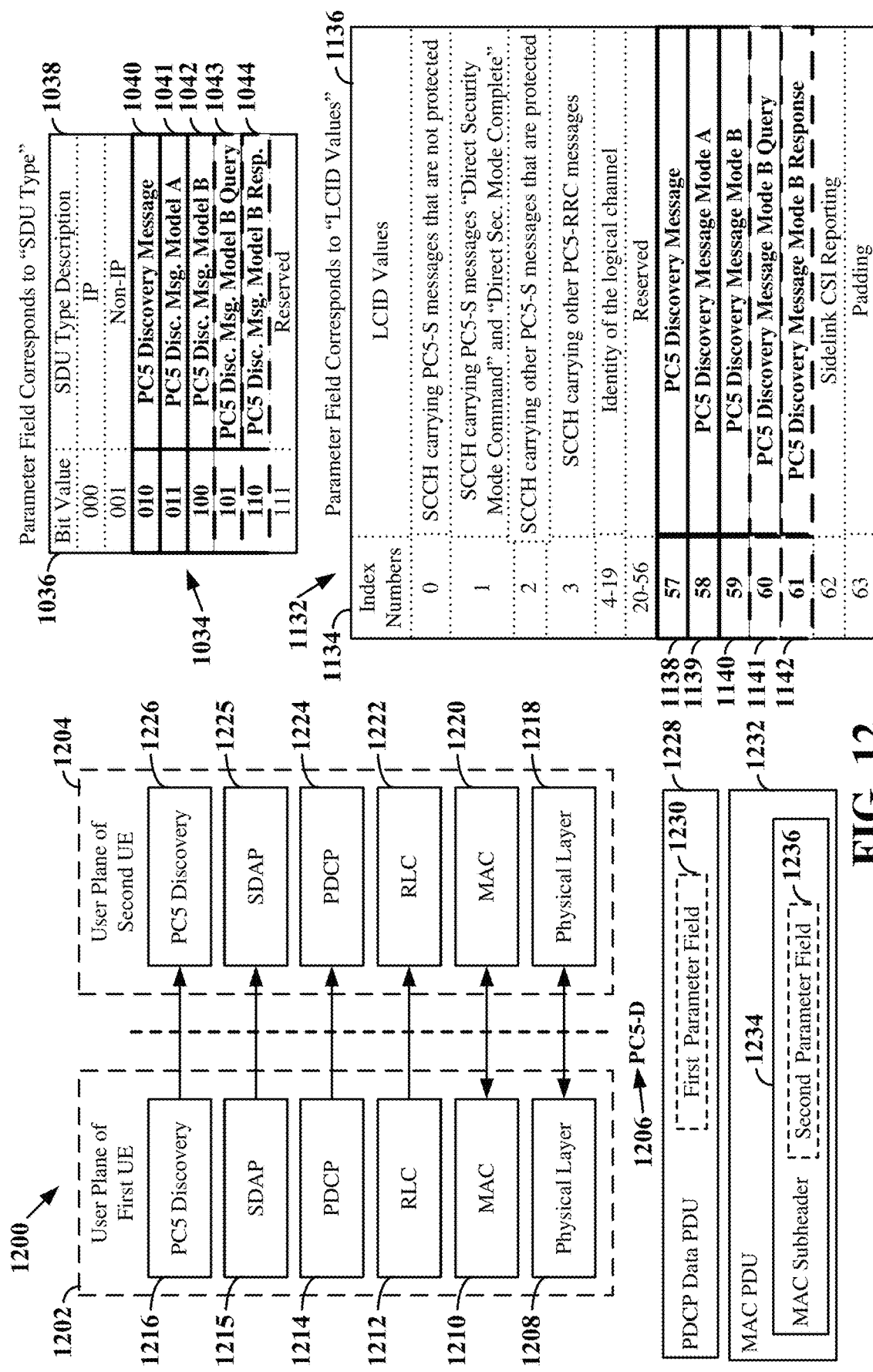
FIG. 12 is a diagram depicting a third pair of user plane protocol stacks of a first UE and a second UE along with an exemplary first data structure and second data structure according to some aspects of the disclosure.

FIG. 12 is a diagram depicting a third pair of user plane protocol stacks (referred to individually and collectively as protocol stack 1200) of a first UE 1202 and a second UE 1204 along with an exemplary first data structure 1228 (e.g., a PDCP Data PDU) and second data structure 1234 (e.g., a MAC subheader) of a MAC PDU 1232 according to some aspects of the disclosure. The first data structure 1228 and the second data structure 1234 may include a parameter indicative of a discovery message according to some aspects of the disclosure. The discovery message may be a PC5 Discovery Message. The first UE 1202 may be exemplified by remote UE 318 of FIG. 3, remote UE 602 of FIG. 6, remote UE 702 of FIG. 7, UE-1 802 of FIG. 8, and/or UE-1 902 of FIG. 9. The second UE 1204 may be exemplified by relay UE 314 of FIG. 3, UE-to-Network relay UE 604 of FIG. 6, UE-to-Network relay UE 704 of FIG. 7, UE-2 804 of FIG. 8, and/or UE-2 902 of FIG. 9. The user plane protocol stacks 1000 are depicted with a PC5-D interface 1006 therebetween, also according to some aspects of the disclosure.

The user plane protocol stack 1200 of the first UE 1202 includes (at a lowest layer, L1, not shown) a physical layer 1208 (otherwise referred to as the PHY layer). The user plane protocol stack 1200 of the first UE 1202 further includes a medium access control (MAC) layer 1210 over the physical layer 1208, a radio link control (RLC) layer 1212 over the MAC layer 1210, and a PDCP layer 1214 over the RLC layer 1212. The MAC layer 1210, RLC layer 1212, and PDCP layer 1214 may exist in a second layer, L2, not shown (see, e.g., L2 508 of FIG. 5). The user plane protocol stack 1200 of the first UE 1202 further includes an SDAP layer 1215 over the PDCP layer 1214 and a PC5 Discovery layer 1216 over the SDAP layer 1215. The PC5 Discovery layer 1216 may exist in a Non Access Stratum (NAS) layer. The SDAP layer 1215 provides a mapping between a 5G core (5GC) quality of service (QoS) flow and a data radio bearer and performs QoS flow ID marking in both downlink and uplink packets. The PC5 Discovery layer 1216 may be regarded as, for example, an application layer.

Similar to the first UE 1202, the user plane protocol stack 1200 of the second UE 1204 includes (at the lowest layer, L1, not shown) a physical layer 1218 (otherwise referred to as the PHY layer). The user plane protocol stack 1200 of the second UE 1204 further includes a MAC layer 1220 over the physical layer 1218, an RLC layer 1222 over the MAC layer 1220, and a PDCP layer 1224 over the RLC layer 1222. The MAC layer 1220, RLC layer 1222, and PDCP layer 1224 may exist in a second layer, L2, not shown (see, e.g., L2 508 of FIG. 5). The user plane protocol stack 1200 of the second UE 1204 further includes an SDAP layer 1225 over the PDCP layer 1224 and a PC5 Discovery layer 1226 over the SDAP layer 1225.

FIG. 12 also includes the table 1034 and table 1132 of FIG. 10 and FIG. 11, respectively. The descriptions of table 1034 and table 1132 are the same or substantially similar to the descriptions of FIG. 10 and FIG. 11, respectively, and will not be repeated for the sake of conciseness. The descriptions of the protocol stack 1200 of the first UE 1202 and the protocol stack 1200 of the second UE 1204 are the same as or substantially similar to the descriptions provided in connection with the protocol stacks 1000 of FIG. 10 and the protocol stacks 1100 of FIG. 11 and will not be repeated for the sake of conciseness.

The illustration of FIG. 12 depicts a first data structure 1228 (e.g., a PDCP Data PDU) and a second data structure 1234 (e.g., a MAC subheader) of a MAC PDU 1232. The first data structure 1228 of FIG. 12 is the same or similar to the first PDCP data PDU (i.e., first data structure 1028) of FIG. 10 or the second PDCP Data PDU (i.e., second data structure 1030) also of FIG. 10. The second data structure 1234 is the same or similar to the MAC subheader of the MAC PDU (i.e., third data structure 1128) of FIG. 11. Descriptions of the first data structure 1028, the second data structure 1030, and the third data structure 1128 will not be repeated for the sake of conciseness.

According to one aspect of the protocol stacks 1200 of FIG. 12, a first UE 1202 may broadcast and/or groupcast a discovery message (e.g., an announcement discovery message) of the Model A type and/or a discovery message (e.g., a solicitation discovery message) of the Model B type using first data structure 1228 (e.g., a PDCP Data PDU) having a data structure that includes a first parameter field 1230 having a value indicative of a discovery message. The discovery message may be a PC5 Discovery Message. According to such an aspect, the data structure of the first data structure 1228 may correspond to a PDCP data PDU formatted for SL DBRs for groupcast and broadcast, such as the first data structure 1028 of FIG. 10. According to such an aspect, the first parameter field 1230 may be an SDU Type (1032 of FIG. 10) parameter field. According to such an aspect, the first parameter field 1230 may have a value of "010" corresponding to an SDU Type description 1038 of PC5 Discovery Message 1040.

According to another aspect of the protocol stacks 1200 of FIG. 12, a first UE 1202 may broadcast and/or groupcast a discovery message (e.g., an announcement discovery message) of the Model A type and/or a discovery message (e.g., a solicitation discovery message) of the Model B type using a MAC PDU 1232 having a data structure that includes a second parameter field 1236 having a value indicative of a discovery message. The discovery message may be a PC5 Discovery Message. According to such an aspect, the second data structure 1234 (e.g., a MAC subheader) of a MAC PDU 1232 may correspond to the third data structure 1128 of FIG. 11. According to such an aspect, the second parameter field 1236 may be an LCID field (1130 of FIG. 11). According to such an aspect, the second parameter field 1236 has an index value of "57" corresponding to an LCID value 1136 of "PC5 Discovery Message" 1138.

According to still another aspect of the protocol stacks 1200 of FIG. 12, a first UE 1202 may broadcast and/or groupcast a discovery message (e.g., an announcement discovery message) of the Model A type and/or a discovery message (e.g., a solicitation discovery message) of the Model B type using both a first data structure 1228 (e.g., a PDCP Data PDU) and a MAC PDU 1232. The discovery message may be a PC5 Discovery Message.

According to yet another aspect of the protocol stacks 1200 of FIG. 12, a second 1204 may respond to a broadcast and/or groupcast a discovery message of the Model A type and/or a broadcast and/or groupcast discovery message of the Model B type using a first data structure 1228 (e.g., a PDCP Data PDU) having a data structure that includes a first field indicative of a discovery message. The discovery message may be a PC5 Discovery Message. According to such an aspect, the data structure may correspond to a PDCP data PDU formatted for SL DRBs for unicast messages, such as the second data structure 1030 of FIG. 10.

The priority handling of messages configured using the first data structure 1228 (e.g., a PDCP Data PDU) and/or the MAC PDU 1232 of FIG. 12 is the same or similar to priority handling of messages configured using the first data structure 1028 of FIG. 10, the second data structure 1030 of FIG. 10, and/or the third data structure 1128 of FIG. 11; accordingly, the description of priority handling for discovery messages associated with FIG. 12 is omitted for the sake of conciseness. Priority handling of messages configured according to the example of FIG. 12 offers the benefits of priority handling achieved using the examples of FIG. 10 and FIG. 11.

The message security aspects of a PC5 Discovery Message associated with the examples of FIGS. 10, 11, and 12 indicate that there may be no ciphering and integrity protection in the PDCP layer. According to some aspects, a relay UE, such as the second UE 1004, 1104, and 1204 of FIGS. 10, 11, and 12, respectively may not implement ciphering and integrity protection so that the relay UE can complete at least an initial connection with the remote UE, such as the first UE 1002, 1102, and 1202 of FIGS. 10, 11, and 12, respectively. Security protection may be provided, for example, via the DDNMF (e.g., in the application layer).

Figure 13:
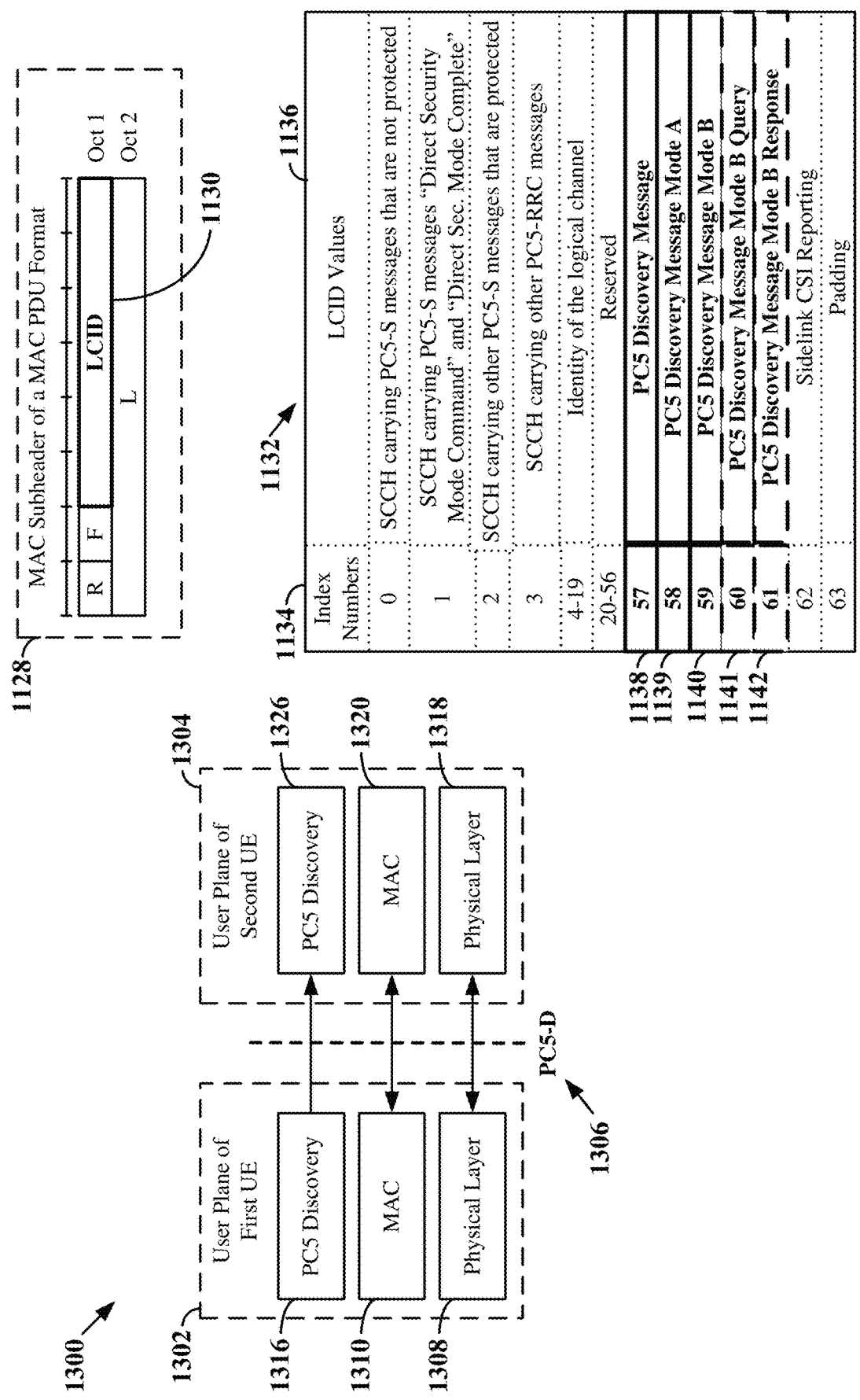
FIG. 13 is a diagram depicting a fourth pair of user plane protocol stacks of a first UE and a second UE along with the exemplary third data structure according to some aspects of the disclosure.

FIG. 13 is a diagram depicting a fourth pair of user plane protocol stacks (referred to individually and collectively as protocol stack 1300) of a first UE 1302 and a second UE 1304 along with the exemplary third data structure 1128 (reproduced from FIG. 11) that may carry an indication of a discovery message according to some aspects of the disclosure. The third data structure 1128 may carry an indication of a discovery message according to some aspects of the disclosure. The discovery message may be a PC5 Discovery Message. The first UE 1302 may be exemplified by remote UE 318 of FIG. 3, remote UE 602 of FIG. 6, remote UE 702 of FIG. 7, UE-1 802 of FIG. 8, and/or UE-1 902 of FIG. 9. The second UE 1304 may be exemplified by relay UE 314 of FIG. 3, UE-to-Network relay UE 604 of FIG. 6, UE-to-Network relay UE 704 of FIG. 7, UE-2 804 of FIG. 8, and/or UE-2 904 of FIG. 9. The user plane protocol stacks 1300 are depicted with a PC5-D interface 1306 therebetween, also according to some aspects of the disclosure.

In the example of FIG. 13, the third data structure 1128 is depicted as MAC subheader with an 8-bit LCID field and is the same as the third data structure 1128 described in connection with FIG. 11. Accordingly, a description of the third data structure 1128 is omitted for the sake of conciseness.

The user plane protocol stack 1300 of the first UE 1302 includes (at a lowest layer, L1, not shown) a physical layer 1308 (otherwise referred to as the PHY layer). The user plane protocol stack 1300 of the first UE 1302 further includes a medium access control (MAC) layer 1310 over the physical layer 1308. The MAC layer 1310 may exist in a second layer, L2, not shown (see, e.g., L2 508 of FIG. 5). The user plane protocol stack 1300 of the first UE 1302 further includes a PC5 Discovery layer 1316 over the MAC layer 1310. The PC5 Discovery layer 1316 may exist in a third layer, L3, not shown (see, e.g., L3 509 of FIG. 5).

Similar to the first UE 1302, the user plane protocol stack 1300 of the second UE 1304 includes (at the lowest layer, L1, not shown) a physical layer 1318 (otherwise referred to as the PHY layer). The user plane protocol stack 1300 of the second UE 1304 further includes a medium access control (MAC) layer 1320 over the physical layer 1318. The MAC layer 1320 may exist in a second layer, L2, not shown (see, e.g., L2 508 of FIG. 5). The user plane protocol stack 1300 of the second UE 1304 further includes a PC5 Discovery layer 1326 over the MAC layer 1320.

The first data structure 1028 of FIG. 10 and the second data structure 1030 of FIG. 10 are not applicable to the example of FIG. 13 because those data structures relied on PDCP PDUs and the user plane protocol stacks 1300 of FIG. 13 do not include RLC or PDCP layer. The third data structure 1128, as applied to the example of FIG. 13, may be used, for example, to convey a discovery message of the Model A type and/or a discovery message of the Model B type. The discovery message may be a PC5 Discovery Message. The third data structure 1128 includes a logical channel identification (LCID) field 1130. The LCID field 1130, the table 1132, the index numbers 1134, the LCID values 1136, and the PC5 Discovery Message 1138 corresponding to the index number "57" are all as described in connection with FIG. 11; their descriptions will be omitted for the sake of conciseness.

In some aspects of the disclosure, a remote UE (e.g., remote UE 318 of FIG. 3, remote UE 602 of FIG. 6, remote UE 702 of FIG. 7, UE-1 802 of FIG. 8, UE-1 902 of FIG. 9, and first UEs 1002, 1102, 1202, 1302 of FIGS. 10-13, respectively) may broadcast and/or groupcast a discovery message (e.g., an announcement discovery message) of the Model A type and/or a discovery message (e.g., a solicitation discovery message) of the Model B type using data structure indicative of a discovery message. The discovery message may be a PC5 Discovery Message. In some aspects of the disclosure a relay UE (e.g., relay UE 314 of FIG. 3, UE-to-Network relay UE 604 of FIG. 6, UE-to-Network relay UE 704 of FIG. 7, UE-2 804 of FIG. 8, UE-2 802 of FIG. 9, and second UEs 1004, 1104, 1204, 1304 of FIGS. 10-13, respectively) may respond to the broadcast and/or groupcast of a PC5 Discovery Message (e.g., a solicitation discovery message) using a data structure indicative of the PC5 Discovery Message.

The priority handling of messages configured using the third data structure 1128 in the context of FIG. 13 is the same or similar to priority handling of messages configured using the third data structure 1128 of FIG. 11; accordingly, the description of priority handling is omitted for the sake of conciseness. Priority handling of messages configured according to the example of FIG. 13 offers the benefits of priority handling achieved using the examples of FIG. 11.

The preceding examples illustrated in FIGS. 10, 11, 12, and 13 and described in the text associated therewith apply to Layer 2 (L2) relays and Layer 3 (L3) relays.

Figure 14:
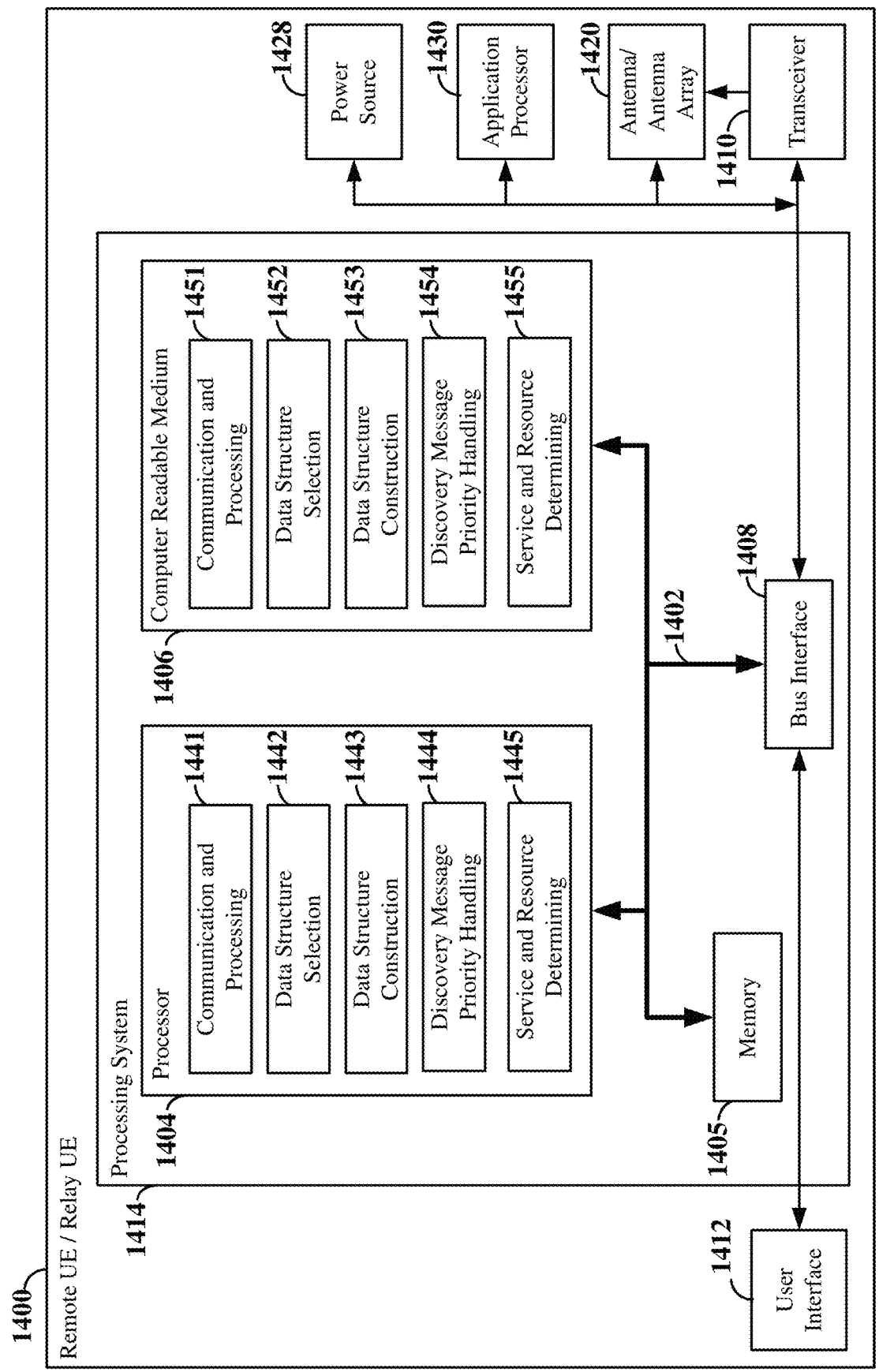
FIG. 14 is a block diagram illustrating an example of a hardware implementation of a remote UE and/or a relay UE, configured for PC5 communication, employing a processing system according to some aspects of the disclosure.

FIG. 14 is a block diagram illustrating an example of a hardware implementation of a remote UE and/or a relay UE, configured for PC5 communication, (referred to hereinafter as the UE 1400) employing a processing system 1414 according to some aspects of the disclosure. For example, the UE 1400 may be any UE or wireless communication device configured for PC5 communication as illustrated in any one or more of FIGS. 1-3 and 6-13.

In accordance with various aspects of the disclosure, an element, or any portion of an element, or any combination of elements may be implemented with a processing system 1414 that includes one or more processors, such as processor 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1400 may be configured to perform any one or more of the functions described herein. That is, the processor 1404, as utilized in UE 1400, may be used to implement any one or more of the methods or processes described and illustrated, for example, in FIGS. 6-9, 15, and/or 16.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further.

A bus interface 1408 provides an interface between the bus 1402 and a transceiver 1410. The transceiver 1410 may be, for example, a wireless transceiver. The transceiver 1410 provides a means for communicating with various other apparatus over a transmission medium (e.g., air interface). The transceiver 1410 may further be coupled to one or more antennas/antenna array/antenna module 1420. The bus interface 1408 further provides an interface between the bus 1402 and a user interface 1412 (e.g., keypad, display, touch screen, speaker, microphone, control features, etc.). Of course, such a user interface 1412 is optional, and may be omitted in some examples. In addition, the bus interface 1408 further provides an interface between the bus 1402 and a power source 1428, and between the bus 1402 and an application processor 1430, which may be separate from the processor 1404 and/or a modem (not shown) of the UE 1400 or processing system 1414.

One or more processors, such as processor 1404, may be responsible for managing the bus 1402 and general processing, including the execution of software stored on the computer-readable medium 1406. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1406. The software, when executed by the processor 1404, causes the processing system 1414 to perform the various processes and functions described herein for any particular apparatus.

The computer-readable medium 1406 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product or article of manufacture. By way of example, a computer program product or article of manufacture may include a computer-readable medium in packaging materials. In some examples, the computer-readable medium 1406 may be part of the memory 1405. Those skilled in the art will recognize how best to implement the described functionality presented throughout this disclosure depending on the particular application and the overall design constraints imposed on the overall system. The computer-readable medium 1406 and/or the memory 1405 may also be used for storing data that is manipulated by the processor 1404 when executing software.

In some aspects of the disclosure, the processor 1404 may include communication and processing circuitry 1441 configured for various functions, including for example communicating with another UE (for example over a PC5 interface), a base station (for example over a UU interface), a network core (e.g., a 5G core network via a base station), or any other entity, such as, for example, local infrastructure or an entity communicating with the UE 1400 via the Internet, such as a network provider. In some examples, the communication and processing circuitry 1441 may include one or more hardware components that provide the physical structure that performs processes related to wireless communication (e.g., signal reception and/or signal transmission) and signal processing (e.g., processing a received signal and/or processing a signal for transmission, such as for transmission over a user plane a discovery message utilizing a first data structure including a first parameter indicative of the discovery message and/or for transmitting over a user plane using a determined sidelink resource a discovery message including an indication of the message being the discovery message for the service). In addition, the communication and processing circuitry 1441 may be configured to receive and process uplink traffic and uplink control messages (e.g., similar to uplink traffic 116 and uplink control 118 of FIG. 1) and process and transmit downlink traffic and downlink control messages (e.g., similar to downlink traffic 112 and downlink control 114) and/or receive, transmit, and process sidelink messages (e.g., similar to sidelink 124 of FIG. 1) via the antennas/antenna array/antenna module 1420 and the transceiver 1410. The communication and processing circuitry 1441 may further be configured to execute communication and processing software 1451 stored on the computer-readable medium 1406 to implement one or more functions described herein.

In some aspects of the disclosure, the processor 1404 may include data structure selection circuitry 1442 configured for various functions, including, for example, selecting a data structure for transmission of the discovery message, such as a first data structure (e.g., 1028 of FIG. 10) exemplified as a PDCP data PDU formatted for SL DRBs for groupcast and broadcast transmission, a second data structure (e.g., 1030 of FIG. 10) exemplified as a PDCP data PDU formatted for SL DRBs for unicast transmission, and a third data structure (e.g., 1128 of FIG. 11) exemplified as a MAC subheader of a MAC PDU, or any combination thereof. In some examples, the data structure selection circuitry 1442 may include one or more hardware components that provide the physical structure that performs processes related to performing data structures such as the first, second, third, or combination data structures. The data structure selection circuitry 1442 may further be configured to execute data structure selection software 1452 stored on the computer-readable medium 1406 to implement one or more functions described herein.

In some aspects of the disclosure, the processor 1404 may include data structure construction circuitry 1443 configured for various functions, including, for example, constructions a data structure for transmission of the discovery message, such as a first data structure (e.g., 1028 of FIG. 10) exemplified as a PDCP data PDU formatted for SL DRBs for groupcast and broadcast transmission, a second data structure (e.g., 1030 of FIG. 10) exemplified as a PDCP data PDU formatted for SL DRBs for unicast transmission, and a third data structure (e.g., 1128 of FIG. 11) exemplified as a MAC subheader of a MAC PDU, or any combination thereof. In some examples, the data structure construction circuitry 1443 may include one or more hardware components that provide the physical structure that performs processes related to performing data structure construction of the discovery message, such as a first data structure (e.g., 1028 of FIG. 10) exemplified as a PDCP data PDU formatted for SL DRBs for groupcast and broadcast transmission, a second data structure (e.g., 1030 of FIG. 10) exemplified as a PDCP data PDU formatted for SL DRBs for unicast transmission, and a third data structure (e.g., 1128 of FIG. 11) exemplified as a MAC subheader of a MAC PDU, or any combination thereof. The data structure construction circuitry 1443 may further be configured to execute data structure construction software 1453 stored on the computer-readable medium 1406 to implement one or more functions described herein. In some aspects of the disclosure, the processor 1404 may include discovery message priority handling circuitry 1444 configured for various functions, including, for example, enforcing a priority level of a discovery message transported on a physical sidelink shared channel (PSSCH) as having a lower priority than another message transmitted on the PSCCH or, for example, establishing that a priority of a discovery message is at least one of: based on a logical channel (LCH) priority of a logical channel transporting the discovery message, or fixed to be a highest priority among messages transported on a sidelink traffic channel (STCH). The discovery message may be a PC5 Discovery Message. In some examples, the discovery message priority handling circuitry 1444 may include one or more hardware components that provide the physical structure that performs processes related to performance of discovery message priority handling. The discovery message priority handling circuitry 1444 may further be configured to execute discovery message priority handling software 1454 stored on the computer-readable medium 1406 to implement one or more functions described herein.

In some aspects of the disclosure, the processor 1404 may include service and resource determining circuitry 1445 configured for various functions, including, for example, determining to use a service associated with a sidelink communication, determining a contents of a discovery message including an indication of the message being the discovery message for the service, and/or determining a sidelink resource for use to transmit the discovery message. In some examples, the service and resource determining circuitry 1445 may include one or more hardware components that provide the physical structure that performs processes related to, for example, the recited determinations. The service and resource determining circuitry 1445 may further be configured to execute service and resource determining software 1455 stored on the computer-readable medium 1406 to implement one or more functions described herein.

Figure 15:
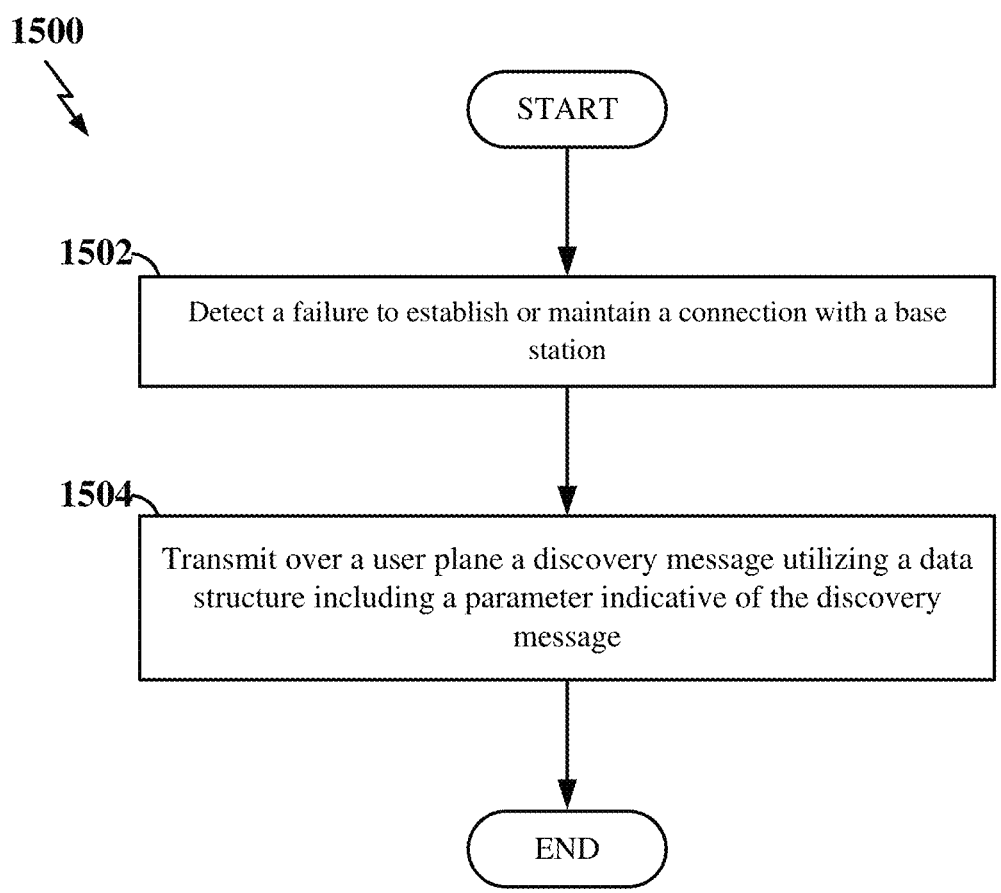
FIG. 15 is a flow chart illustrating a first exemplary process (e.g., a method) at a remote UE, configured for PC5 communication in accordance with some aspects of the disclosure.

FIG. 15 is a flow chart illustrating an exemplary process 1500 (e.g., a method) at a remote UE, configured for PC5 communication, such as UE 1400, for transmitting over a user plane a discovery message utilizing a data structure including a parameter indicative of the discovery message in accordance with some aspects of the disclosure. As described below, some or all illustrated features may be omitted in a particular implementation within the scope of the present disclosure, and some illustrated features may not be required for implementation of all embodiments. In some examples, the process 1500 may be carried out by the UE 1400 illustrated in FIG. 14. In some examples, the process 1500 may be carried out by any suitable apparatus or means for carrying out the functions or algorithms described herein.

At block 1502, the first UE may detect a failure to establish or maintain a connection with a base station; in other words, the UE may recognize and react to a failure to establish or maintain a connection with a base station. At block 1504, the UE may transmit over a user plane a discovery message utilizing a data structure including a parameter indicative of the discovery message. According to some aspects, the discovery message may be a PC5 Discovery Message that may have content created by a PC5 Discovery layer of a protocol stack of the first UE.

In some examples, the first UE may transmit the discovery message as at least one of: a broadcast message or a groupcast message. In some examples, the UE may transmit the discovery message as at least one of: an announcement discovery message as a broadcast or groupcast message that may announce an ability of the first UE to send user data, control signaling, or both to a second UE that relays the user data, control signaling, or both (collectively referred to as traffic) to the base station; or a response discovery message as a unicast message in response to a solicitation discovery message from the second UE.

According to some aspect, the UE may also establish a one-to-one connection with the second UE, and may schedule, by the first UE, the one-to-one connection between the first UE and the second UE. According to some aspects, relaying user data, control signaling, or both through the second UE may be practiced according to at least one of a Layer 2 relay procedure, or a Layer 3 relay procedure. In some examples, the first UE may establish a single-hop relay between the first UE that may be outside of an air interface coverage area of the base station and a second UE that may be inside the air interface coverage area of the base station and maintains a second UE connection with the base station over the air interface.

In some examples, a protocol stack of the first UE may include: a physical layer, a medium access control (MAC) layer over the physical layer, a radio link control (RLC) layer over the MAC layer, a packet data convergence protocol (PDCP) layer over the RLC layer, a Service Data Adaptation Protocol (SDAP) over the PDCP layer, and a PC5 Discovery layer over the SDAP layer. According to one aspect, ciphering and integrity protection are not performed in the PDCP layer.

In other examples a protocol stack of the first UE may include: a physical layer, a medium access control (MAC) layer over the physical layer, and a PC5 Discovery layer over the MAC layer. In some aspects, a protocol stack of the first UE may include a PC5 Discovery layer and at least one of: a packet data convergence protocol (PDCP) layer (the parameter indicative of the discovery message may be a Service Data Unit (SDU) Type); or a medium access control (MAC) layer (the parameter indicative of the discovery message may be a Logical Channel ID (LCID); or a combination thereof. In some examples, a value of the SDU Type and/or the LCID that may correspond to a PC5 Discovery Message may indicate that the discovery message may be a PC5 Discovery Message that may have content created by a PC5 Discovery layer of a protocol stack of the first UE. In some examples the LCID may be fixed.

According to some aspects, the discovery message may be transported on the PSSCH and may have a lowest priority among messages transmitted on a physical sidelink control channel (PSCCH). The discovery message may be transported on a sidelink traffic channel (STCH) and may have a lower priority than another message transmitted on the PSCCH. According to other aspects, a priority of the discovery message may be highest among messages transported on a sidelink traffic channel (STCH). In still other aspects, a priority of the discovery message may be at least one of: based on a logical channel (LCH) priority of a logical channel transporting the discovery message; or fixed to be a highest priority among messages transported on a sidelink traffic channel (STCH).

In one configuration, the first UE (e.g., UE 1400) processing the method of discovery in a wireless communication network includes means for detecting the failure to establish or maintain a connection with a base station and means for transmitting over a user plane a discovery message utilizing a data structure including a parameter indicative of the discovery message. In one aspect, the aforementioned means may be the processor 1404 shown in FIG. 14 and configured to perform the functions recited by the aforementioned means. In another aspect, the aforementioned means may be a circuit, or any apparatus configured to perform the functions recited by the aforementioned means.

Figure 16:
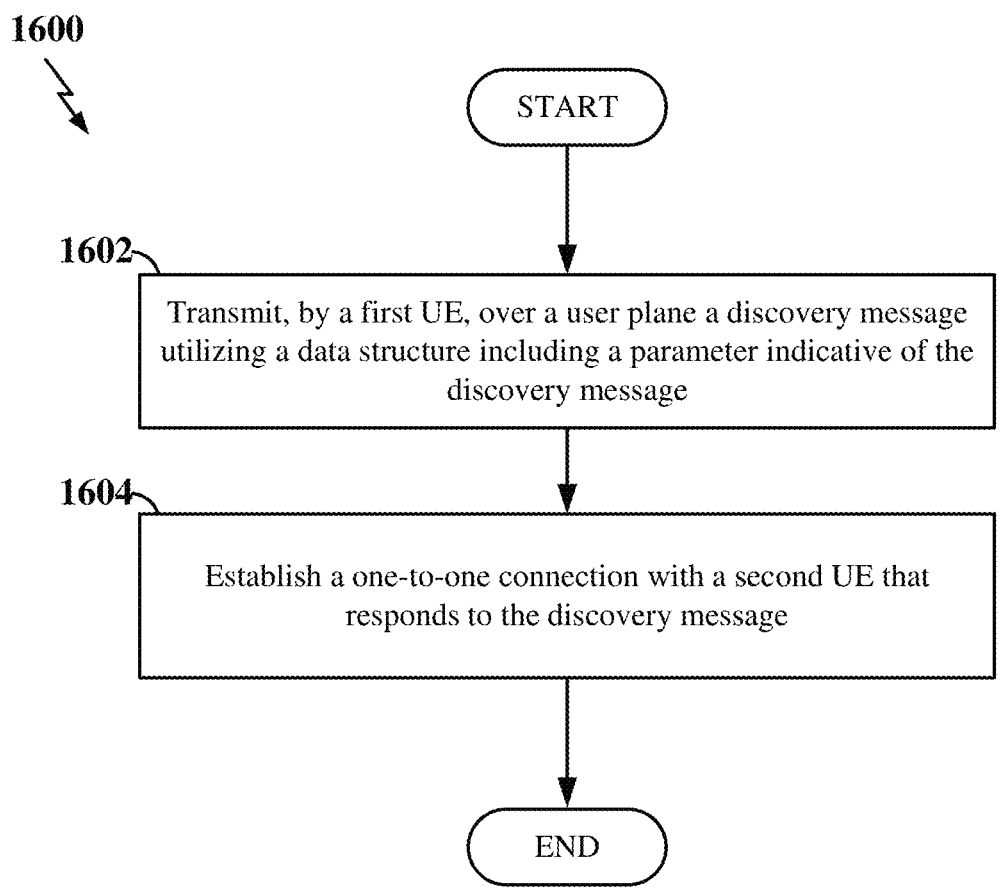
FIG. 16 is a flow chart illustrating a second exemplary process (e.g., a method) at a relay UE, configured for PC5 communication in accordance with some aspects of the disclosure.

FIG. 16 is a flow chart illustrating an exemplary process 1600 (e.g., a method) at a relay UE (a first UE), configured for PC5 communication, such as UE 1400, for transmitting over a user plane a discovery message utilizing a data structure including a parameter indicative of the discovery message in accordance with some aspects of the disclosure. As described below, some or all illustrated features may be omitted in a particular implementation within the scope of the present disclosure, and some illustrated features may not be required for implementation of all embodiments. In some examples, the process 1600 may be carried out by the UE 1400 illustrated in FIG. 14. In some examples, the process 1600 may be carried out by any suitable apparatus or means for carrying out the functions or algorithms described herein.

At block 1602, the first UE may transmit over a user plane a discovery message utilizing a data structure including a parameter indicative of the discovery message. At block 1604, the first UE may establish a one-to-one connection with a second UE that responds to the discovery message. According to some aspects, the discovery message may be a PC5 Discovery Message that may have content created by a PC5 Discovery layer of a protocol stack of the first UE.

In some examples, the first UE may transmit the discovery message as at least one of: a broadcast message or a groupcast message. In some examples, the first UE may transmit the discovery message as at least one of: an announcement discovery message as a broadcast or groupcast message that may announce an ability of the first UE to engage in relaying traffic of the second UE to a base station; or a response discovery message as a unicast message that may be in response to a solicitation discovery message from the second UE.

According to some aspect, the first UE may schedule the one-to-one connection between the first UE and the second UE. In some aspects, the first UE may relay user data, control signaling, or both (collectively referred to as traffic) between the second UE and the base station according to at least one of: a Layer 3 relay procedure; or a Layer 3 relay procedure. In some aspects, the first UE may further establish a single-hop relay between a second UE that may be outside of an air interface coverage area of the base station and the first UE that may be inside the air interface coverage area of the base station and maintains a connection with the base station over the air interface.

In some examples, a protocol stack of the first UE may include: a physical layer, a medium access control (MAC) layer over the physical layer, a radio link control (RLC) layer over the MAC layer, a packet data convergence protocol (PDCP) layer over the RLC layer, a Service Data Adaptation Protocol (SDAP) layer over the PDCP layer, and a PC5 Discovery layer over the SDAP layer. In some examples ciphering and integrity protection may not be performed in the PDCP layer. According to other aspects, a protocol stack of the first UE may include: a physical layer, a medium access control (MAC) layer over the physical layer, and a PC5 Discovery layer over the MAC layer. In some examples a protocol stack of the first UE may include a PC5 Discovery layer and at least one of: a packet data convergence protocol (PDCP) layer (where, for example, the parameter indicative of the discovery message may be a Service Data Unit (SDU) Type); a medium access control (MAC) layer (where, for example, the parameter indicative of the discovery message may be a Logical Channel ID (LCID)); or a combination thereof. In some examples, a value of the SDU Type and/or the LCID that corresponds to a PC5 Discovery Message indicates that the discovery message may be a PC5 Discovery Message. In some examples, the LCID may be fixed.

According to some aspects, the discovery message may be transported on the PSSCH and may have a lowest priority among messages transmitted on a physical sidelink control channel (PSCCH). In other aspects, the discovery message may be transported on a sidelink traffic channel (STCH) and may have a lower priority than another message transmitted on the PSCCH. In still other aspects, a priority of the discovery message may be highest among messages transported on a sidelink traffic channel (STCH). In some examples, a priority of the discovery message may be based on a logical channel (LCH) priority of a logical channel transporting the discovery message, or may be fixed to be a highest priority among messages transported on a sidelink traffic channel (STCH).

In one configuration, the first UE (e.g., UE 1400) processing the method of discovery in a wireless communication network includes means for transmitting over a user plane a discovery message utilizing a data structure including a parameter indicative of the discovery message, and means for establishing a one-to-one connection with a second UE that responds to the discovery message. In one aspect, the aforementioned means may be the processor 1404 shown in FIG. 14 and configured to perform the functions recited by the aforementioned means. In another aspect, the aforementioned means may be a circuit, or any apparatus configured to perform the functions recited by the aforementioned means.

Figure 17:
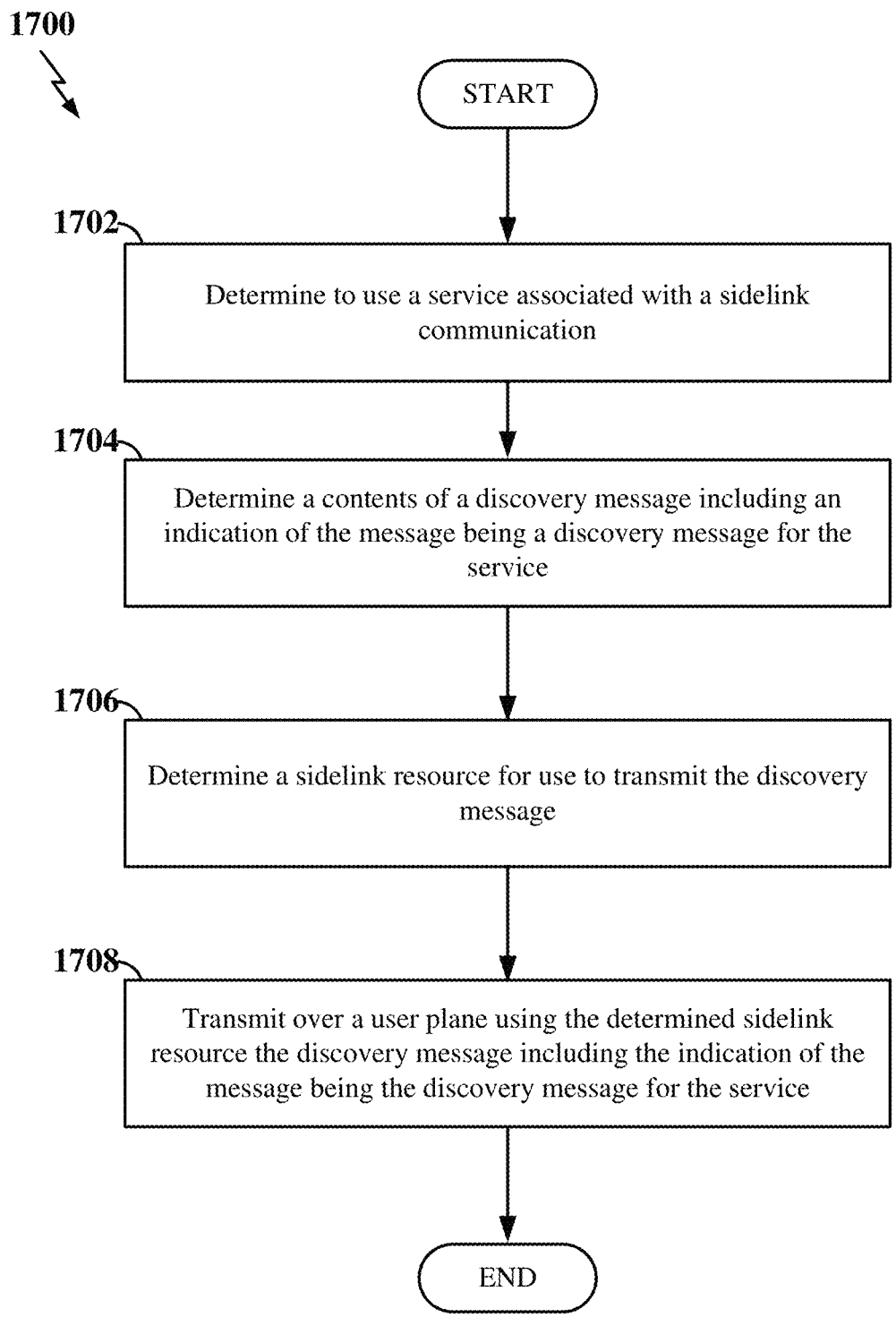
FIG. 17 is a flow chart illustrating a third exemplary process (e.g., a method) at a relay UE, configured for PC5 communication in accordance with some aspects of the disclosure.

FIG. 17 is a flow chart illustrating an exemplary process 1700 (e.g., a method) at a relay UE (a first UE), configured for PC5 communication, such as UE 1400, in accordance with some aspects of the disclosure. As described below, some or all illustrated features may be omitted in a particular implementation within the scope of the present disclosure, and some illustrated features may not be required for implementation of all embodiments. In some examples, the process 1700 may be carried out by the UE 1400 illustrated in FIG. 14. In some examples, the process 1700 may be carried out by any suitable apparatus or means for carrying out the functions or algorithms described herein.

At block 1702, the first UE may determine to use a service associated with a sidelink communication. At block 1704, the first UE may determine a contents of a discovery message including an indication of the message may be a discovery message for the service. At block 1706 the first UE may Determine a sidelink resource for use to transmit the discovery message. At block 1708 the first UE may transmit over a user plane using the determined sidelink resource the discovery message including the indication of the message being the discovery message for the service.

In one example the first UE may also transmit over the user plane using the determined sidelink resource the discovery message, wherein an upper layer protocol header indicates that the discovery message may be at least one of: an announcement discovery message, a solicitation discovery message, or a response to a solicitation discovery message. In some aspects, the announcement discovery message may be a sidelink model A query that may be at least one of: broadcast, or groupcast, the solicitation discovery message may be a sidelink model B query that may be at least one of: broadcast, or groupcast, and the response to the received solicitation discovery message may be a sidelink model B response that may be unicast.

In another example the first UE may also include the indication of the message being a discovery message in at least one of: a packet data convergence protocol (PDCP) data packet data unit (PDU) of a PDCP entity associated with the user plane, or a medium access control (MAC) packet data unit (PDU) of a MAC entity associated with the user plane, and configuring the contents of the discovery message at an upper layer protocol that may be over at least one of: a PDCP protocol layer, or a MAC protocol layer. In some aspects the upper layer protocol may be a PC5 Discovery layer protocol. In other aspects the contents of the discovery message are included in a header of the upper layer protocol and the indication of the message being the discovery message may be included in the PDCP data PDU. In other aspects the PDCP data PDU has a data structure that includes a service data unit (SDU) Type and a value of SDU Type indicates that the discovery message may be at least one of: a PC5 discovery message, an announcement discovery message, or a solicitation discovery message, wherein a type of the discovery message may be included in the header of the upper layer protocol, or a response to a received solicitation discovery message. In some examples, the announcement discovery message may be a sidelink model A query that may be at least one of: broadcast, or groupcast, the solicitation discovery message may be a sidelink model B query that may be at least one of: broadcast, or groupcast, and the response to the received solicitation discovery message may be a sidelink model B response that may be unicast.

According to some aspects, the contents of the discovery message are included in a header of the upper layer protocol and the indication of the message being the discovery message may be included in a MAC subheader of the MAC PDU. In some examples the MAC subheader has a data structure that includes a logical channel identifier (LCID) and a value of LCID indicates that the discovery message may be at least one of: a PC5 discovery message, an announcement discovery message, or a solicitation discovery message, wherein a type of the discovery message may be included in the header of the upper layer protocol, or a response to a received solicitation discovery message. In other examples, the announcement discovery message may be a sidelink model A query that may be at least one of: broadcast, or groupcast, the solicitation discovery message may be a sidelink model B query that may be at least one of: broadcast, or groupcast, and the response to the received solicitation discovery message may be a sidelink model B response that may be unicast.

In other aspects, the sidelink resource may be a physical sidelink shared channel (PSSCH). In one example the first UE may also transmit the discovery message as at least one of: a broadcast message or a groupcast message.

In one example the first UE may also transmit the discovery message as at least one of: an announcement discovery message as a broadcast or groupcast message that announces an ability of the first UE to send user data, control signaling, or both to a second UE that relays the user data, control signaling, or both to the base station, or a response discovery message as a unicast message in response to a solicitation discovery message from the second UE.

In one example the first UE may also transmit the discovery message as at least one of: an announcement discovery message as a broadcast or groupcast message that announces an ability of the first UE to relay user data, control signaling, or both to a base station from a second UE, or a response discovery message as a unicast message in response to a solicitation discovery message from the second UE.

In another example the first UE may also establish a one-to-one connection with a second UE, and relay user data, control signaling, or both to a base station through the second UE according to at least one of: a Layer 2 relay procedure, or a Layer 3 relay procedure.

In yet another example, the first UE may also establish a one-to-one connection with a second UE, and relay user data, control signaling, or both to a base station from the second UE according to at least one of: a Layer 2 relay procedure, or a Layer 3 relay procedure.

According to some aspects the first UE may additionally establish a single-hop relay between the first UE that may be outside of an air interface coverage area of the base station and a second UE that may be inside the air interface coverage area of the base station and maintains a second UE connection with the base station over the air interface.

According to some aspects the first UE also establish a single-hop relay between a second UE that may be outside of an air interface coverage area of a base station and the first UE that may be inside the air interface coverage area of the base station and maintains a connection with the base station over the air interface.

In one example a protocol stack of the first UE may be comprised of: a physical layer, a medium access control (MAC) layer over the physical layer, a radio link control (RLC) layer over the MAC layer, a packet data convergence protocol (PDCP) layer over the RLC layer, a Service Data Adaptation Protocol (SDAP) over the PDCP layer, and a PC5 Discovery layer over the SDAP layer. In one example, ciphering and integrity protection are not performed in the PDCP layer.

According to some aspects, a protocol stack of the first UE may be comprised of: a physical layer, a medium access control (MAC) layer over the physical layer, and a PC5 Discovery layer over the MAC layer.

According to other aspects, a protocol stack of the first UE includes a PC5 Discovery layer and at least one of: a packet data convergence protocol (PDCP) layer, wherein the indication of the message being the discovery message may be represented by an indicated Service Data Unit (SDU) Type of a PDCP data PDU, a medium access control (MAC) layer, wherein the indication of the message being the discovery message may be a logical channel identifier (LCID), or a combination thereof.

In one example, the discovery message may be transported on a physical sidelink shared channel (PSSCH) and has a lowest priority among messages transmitted on the PSCCH. In another example the discovery message may be transported on a sidelink traffic channel (STCH) and has a lower priority than another message transmitted on the PSCCH.

In some aspects, a priority of the discovery message may be highest among messages transported on a sidelink traffic channel (STCH). In one example a priority of the discovery message may be at least one of: based on a logical channel (LCH) priority of a logical channel transporting the discovery message, or fixed to be a highest priority among messages transported on a sidelink traffic channel (STCH).

In one configuration, the first UE (e.g., UE 1400) processing the method of discovery in a wireless communication network includes means for determining to use a service associated with a sidelink communication, means for determining a contents of a discovery message including an indication of the message being a discovery message for the service, means for determining a sidelink resource for use to transmit the discovery message, and means for transmitting over a user plane using the determined sidelink resource the discovery message including the indication of the message being the discovery message for the service. In one aspect, the aforementioned means may be the processor 1404 shown in FIG. 14 and configured to perform the functions recited by the aforementioned means. In another aspect, the aforementioned means may be a circuit, or any apparatus configured to perform the functions recited by the aforementioned means.

Of course, in the above examples, the circuitry included in the processor is merely provided as an example, and other means for carrying out the described functions may be included within various aspects of the present disclosure, including but not limited to the instructions stored in the computer-readable medium 1406, or any other suitable apparatus or means described in any one of FIGS. 1-3 and 6-14, and utilizing, for example, the processes and/or algorithms described herein in relation to FIGS. 15, 16 and/or 17.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Similarly, the construct "a and/or b" refers to any combination of those items, including single members. As an example, "a and/or b" is intended to cover: a, b, and a and b. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of discovery in a wireless communication network, the method comprising, at a first user equipment (UE):
    determining to use a service associated with a sidelink communication;
    determining a contents of a discovery message;
    determining a sidelink resource to transmit the discovery message; and
    transmitting over a user plane using the determined sidelink resource the discovery message, including an indication of the message being the discovery message,
    wherein the indication of the message being the discovery message is a logical channel identifier (LCID) index number having a predetermined value.

2. The method of claim 1, further comprising:
    transmitting over the user plane using the determined sidelink resource the discovery message, wherein an upper layer protocol header indicates that the discovery message is at least one of:
        an announcement discovery message,
        a solicitation discovery message, or
        a response to the solicitation discovery message.

3. The method of claim 2, wherein:
    the announcement discovery message is a sidelink model A query that is at least one of: broadcast, or groupcast;
    the solicitation discovery message is a sidelink model B query that is at least one of: broadcast, or groupcast; and
    the response to the solicitation discovery message is a sidelink model B response that is unicast.

4. The method of claim 1, further comprising:
    including the indication of the message being the discovery message in at least one of:
        a packet data convergence protocol (PDCP) data packet data unit (PDU) of a PDCP entity associated with the user plane, or
        a medium access control (MAC) packet data unit (PDU) of a MAC entity associated with the user plane; and
    configuring the contents of the discovery message at an upper layer protocol that is over at least one of: a PDCP protocol layer, or a MAC protocol layer.

5. The method of claim 4, wherein the upper layer protocol is a PC5 Discovery layer protocol.

6. The method of claim 4, wherein the contents of the discovery message are included in a header of the upper layer protocol and the indication of the message being the discovery message is included in the PDCP data PDU.

7. The method of claim 6, wherein the PDCP data PDU has a data structure that includes a service data unit (SDU) Type and a value of SDU Type indicates that the discovery message is at least one of:
    a PC5 discovery message, an announcement discovery message, or a solicitation discovery message, wherein a type of the discovery message is included in the header of the upper layer protocol, or
    a response to a received solicitation discovery message.

8. The method of claim 7, wherein:
    the announcement discovery message is a sidelink model A query that is at least one of: broadcast, or groupcast;
    the solicitation discovery message is a sidelink model B query that is at least one of: broadcast, or groupcast; and
    the response to the received solicitation discovery message is a sidelink model B response that is unicast.

9. The method of claim 4, wherein the contents of the discovery message are included in a header of the upper layer protocol and the indication of the message being the discovery message is included in a MAC subheader of the MAC PDU.

10. The method of claim 9, wherein the MAC subheader has a data structure that includes the LCID index number having the predetermined value that indicates that the discovery message is at least one of:
    a PC5 discovery message, an announcement discovery message, or a solicitation discovery message, wherein a type of the discovery message is included in the header of the upper layer protocol, or
    a response to a received solicitation discovery message.

11. The method of claim 10, wherein:
    the announcement discovery message is a sidelink model A query that is at least one of: broadcast, or groupcast;
    the solicitation discovery message is a sidelink model B query that is at least one of: broadcast, or groupcast; and
    the response to the received solicitation discovery message is a sidelink model B response that is unicast.

12. The method of claim 1, wherein the sidelink resource is a physical sidelink shared channel (PSSCH).

13. The method of claim 1, further comprising:
    transmitting the discovery message as at least one of: a broadcast message or a groupcast message.

14. The method of claim 1, further comprising:
    transmitting the discovery message as at least one of:

an announcement discovery message as a broadcast or groupcast message that announces an ability of the first UE to send user data, control signaling, or both to a second UE that relays the user data, control signaling, or both to a base station; or a response discovery message as a unicast message in response to a solicitation discovery message from the second UE.

15. The method of claim 1, further comprising:
transmitting the discovery message as at least one of:
an announcement discovery message as a broadcast or groupcast message that announces an ability of the first UE to relay user data, control signaling, or both to a base station from a second UE; or a response discovery message as a unicast message in response to a solicitation discovery message from the second UE.

16. The method of claim 1, further comprising:
establishing a one-to-one connection with a second UE; and
relaying user data, control signaling, or both to a base station through the second UE according to at least one of: a Layer 2 relay procedure, or a Layer 3 relay procedure.

17. The method of claim 1, further comprising:
establishing a one-to-one connection with a second UE; and
relaying user data, control signaling, or both to a base station from the second UE according to at least one of: a Layer 2 relay procedure, or a Layer 3 relay procedure.

18. The method of claim 1, further comprising establishing a single-hop relay between the first UE that is outside of an air interface coverage area of a base station and a second UE that is inside the air interface coverage area of the base station and maintains a second UE connection with the base station over the air interface.

19. The method of claim 1, further comprising establishing a single-hop relay between a second UE that is outside of an air interface coverage area of a base station and the first UE that is inside the air interface coverage area of the base station and maintains a connection with the base station over the air interface.

20. The method of claim 1, wherein a protocol stack of the first UE is comprised of: a physical layer, a medium access control (MAC) layer over the physical layer, a radio link control (RLC) layer over the MAC layer, a packet data convergence protocol (PDCP) layer over the RLC layer, a Service Data Adaptation Protocol (SDAP) over the PDCP layer, and a PC5 Discovery layer over the SDAP layer.

21. The method of claim 20, wherein ciphering and integrity protection are not performed in the PDCP layer.

22. The method of claim 1, wherein a protocol stack of the first UE is comprised of: a physical layer, a medium access control (MAC) layer over the physical layer, and a PC5 Discovery layer over the MAC layer.

23. The method of claim 1, wherein a protocol stack of the first UE includes a PC5 Discovery layer and at least one of:
a packet data convergence protocol (PDCP) layer, wherein the indication of the message being the discovery message is represented by an indicated Service Data Unit (SDU) Type of a PDCP data PDU;

a medium access control (MAC) layer, wherein the indication of the message being the discovery message is the LCID index number having the predetermined value; or
a combination thereof.

24. The method of claim 1, wherein a priority of the discovery message is highest among messages transported on a sidelink traffic channel (STCH).

25. The method of claim 1, wherein a priority of the discovery message is at least one of:
based on a logical channel (LCH) priority of a logical channel transporting the discovery message; or
fixed to be a highest priority among messages transported on a sidelink traffic channel (STCH).

26. A user equipment (UE) in a wireless communication network, comprising:
one or more memories; and
one or more processors coupled to the one or more memories, wherein the one or more processors and the memory are configured to:
determine to use a service associated with a sidelink communication;
determine a contents of the discovery message;
determine a sidelink resource to transmit the discovery message; and
transmit over a user plane using the determined sidelink resource the discovery message, including an indication of the message being the discovery message,
wherein the indication of the message being the discovery message is a logical channel identifier (LCID) index number having a predetermined value.

27. A user equipment (UE) in a wireless communication network, comprising:
means for determining to use a service associated with a sidelink communication;
means for determining a contents of the discovery message;
means for determining a sidelink resource to transmit the discovery message; and
means for transmitting over a user plane using the determined sidelink resource the discovery message, including an indication of the message being the discovery message,
wherein the indication of the message being the discovery message is a logical channel identifier (LCID) index number having a predetermined value.

28. An article of manufacture for use by a user equipment (UE) in a wireless communication network, the article comprising:
a non-transitory computer-readable medium having stored therein instructions executable by one or more processors of the user equipment to:
determine to use a service associated with a sidelink communication;
determine a contents of the discovery message;
determine a sidelink resource to transmit the discovery message; and
transmit over a user plane using the determined sidelink resource the discovery message, including an indication of the message being the discovery message,
wherein the indication of the message being the discovery message is a logical channel identifier (LCID) index number having a predetermined value.

* * * * *